United States Patent
Doshi et al.

(10) Patent No.: US 10,701,571 B2
(45) Date of Patent: *Jun. 30, 2020

(54) AUTOMATED VALIDATION AND CALIBRATION PORTABLE TEST SYSTEMS AND METHODS

(71) Applicant: w2bi, Inc., South Plainfield, NJ (US)

(72) Inventors: Dinesh Doshi, South Plainfield, NJ (US); Mark Elston, San Jose, CA (US); Vipul Jain, South Plainfield, NJ (US); Amit Kucheriya, South Plainfield, NJ (US); Derek Diperna, Medford Lakes, NJ (US); Liqun Liu, South Plainfield, NJ (US); Ira Leventhal, San Jose, CA (US)

(73) Assignee: W2BI, INC., South Plainfield, NJ (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/236,314

(22) Filed: Aug. 12, 2016

(65) Prior Publication Data

US 2018/0049050 A1    Feb. 15, 2018

(51) Int. Cl.
*H04W 24/06* (2009.01)
*H04W 88/08* (2009.01)

(52) U.S. Cl.
CPC ............ *H04W 24/06* (2013.01); *H04W 88/08* (2013.01)

(58) Field of Classification Search
CPC .............................. H04W 24/06; H04B 17/00
(Continued)

(56) References Cited

U.S. PATENT DOCUMENTS 3,082,374 A    3/1963    Buuck
4,228,537 A    10/1980    Henckels et al.
(Continued)

FOREIGN PATENT DOCUMENTS

WO    2013192118    12/2013

OTHER PUBLICATIONS

Varga et al. ("LTE corenetwork testing using generated traffic based on models from real-world data", ResearchGate, 2014, pp. 1-6) (Year: 2014).*

(Continued)

*Primary Examiner* — Iftekhar A Khan

(57) ABSTRACT

In one embodiment, a test system comprises: a network access point simulation component, a local control component, and a reference component. The network access point simulation component is configured to simulate communication network access point operations comprising test interactions with user equipment. The number of devices under test included in the user equipment and distinct network access points that are coincidentally simulated are variable. The local control component is configured to direct the network access point simulation component and to control the test interactions with the user equipment. The local control component comprises a test executive operable to direct simulation of communication network operations and the test interactions in accordance with information received from the remote control components. The reference component is operable to communicatively couple with the network access point simulation component similar to the user equipment and validate the test interactions.

13 Claims, 18 Drawing Sheets

(58) Field of Classification Search
USPC .................................................. 703/20
See application file for complete search history.

(56) References Cited

U.S. PATENT DOCUMENTS

| | | | |
|---|---|---|---|
| 4,766,595 A | 8/1988 | Gollomp | |
| 5,475,624 A | 12/1995 | West | |
| 5,827,070 A | 10/1998 | Kershaw et al. | |
| 6,308,065 B1* | 10/2001 | Molinari | H04W 24/00 455/423 |
| 6,522,995 B1 | 2/2003 | Conti et al. | |
| 7,406,645 B2 | 7/2008 | Nozuyama | |
| 7,624,378 B2 | 11/2009 | Achlioptas et al. | |
| 7,810,001 B2 | 10/2010 | Zhou et al. | |
| 7,889,663 B1* | 2/2011 | Wright | H04W 24/06 370/241 |
| 7,895,575 B2 | 2/2011 | Yoon et al. | |
| 8,054,221 B1 | 11/2011 | Luong et al. | |
| 8,131,831 B1* | 3/2012 | Hu | H04M 15/43 379/201.03 |
| 8,283,933 B2 | 10/2012 | Dasnurkar | |
| 8,310,385 B2 | 11/2012 | Dasnurkar | |
| 8,325,614 B2* | 12/2012 | Poon | H04W 4/70 370/241 |
| 8,433,953 B1 | 4/2013 | Gaudette et al. | |
| 8,577,813 B2 | 11/2013 | Weiss | |
| 8,737,980 B2 | 5/2014 | Doshi et al. | |
| 8,781,797 B1* | 7/2014 | Oltman | G06F 11/261 455/115.1 |
| 8,793,117 B1* | 7/2014 | Varshney | H04L 69/18 703/21 |
| 8,856,539 B2 | 10/2014 | Weiss | |
| 8,983,394 B2* | 3/2015 | Deforge | H04B 17/0085 455/67.11 |
| 8,996,166 B2* | 3/2015 | Jenkinson | G06F 3/0418 345/174 |
| 9,065,556 B2 | 6/2015 | Popescu et al. | |
| 9,100,826 B2 | 8/2015 | Weiss | |
| 9,116,873 B2 | 8/2015 | Majumdar et al. | |
| 9,185,675 B2 | 11/2015 | Chen et al. | |
| 9,253,242 B2 | 2/2016 | Macalet et al. | |
| 9,446,519 B2 | 9/2016 | Gray et al. | |
| 9,469,037 B2 | 10/2016 | Matthews et al. | |
| 9,481,084 B2 | 11/2016 | Park | |
| 9,530,137 B2 | 12/2016 | Weiss | |
| 9,544,910 B2 | 1/2017 | Delsol et al. | |
| 9,596,166 B2* | 3/2017 | Iyer | H04L 43/50 |
| 9,652,077 B2 | 5/2017 | Jenkinson | |
| 9,767,009 B2 | 9/2017 | Cobb, Jr. et al. | |
| 9,948,411 B2* | 4/2018 | Diperna | H04W 4/02 |
| 9,959,181 B2* | 5/2018 | Hittel | G06Q 10/10 |
| 9,973,416 B2* | 5/2018 | Henry | H04L 45/28 |
| 10,003,418 B1* | 6/2018 | Yellapantula | H04W 52/367 |
| 10,020,899 B2* | 7/2018 | Diperna | H04M 1/04 |
| 10,025,883 B2 | 7/2018 | Paule et al. | |
| 2001/0003209 A1 | 6/2001 | Sato | |
| 2002/0072359 A1 | 6/2002 | Moles et al. | |
| 2002/0116507 A1 | 8/2002 | Manjure et al. | |
| 2002/0165952 A1 | 11/2002 | Sewell et al. | |
| 2004/0012529 A1 | 1/2004 | Teshirogi et al. | |
| 2004/0214564 A1* | 10/2004 | Rosen | H04W 24/00 455/423 |
| 2005/0060132 A1 | 3/2005 | Hollander et al. | |
| 2005/0083068 A1* | 4/2005 | Clarridge | G01R 31/50 324/601 |
| 2005/0222690 A1 | 10/2005 | Wang et al. | |
| 2006/0075305 A1 | 4/2006 | Robinson et al. | |
| 2006/0208754 A1 | 9/2006 | Takeuchi et al. | |
| 2006/0229018 A1* | 10/2006 | Mlinarsky | H04B 7/0413 455/67.11 |
| 2006/0250972 A1 | 11/2006 | Seebacher et al. | |
| 2006/0282736 A1* | 12/2006 | Schroth | G01R 31/3183 714/742 |
| 2006/0288243 A1 | 12/2006 | Kim | |
| 2007/0050166 A1 | 3/2007 | Spinner et al. | |
| 2007/0150250 A1 | 6/2007 | Inoue et al. | |
| 2007/0281684 A1* | 12/2007 | Parmar | H04W 24/06 455/432.1 |
| 2007/0294580 A1 | 12/2007 | Lu | |
| 2008/0072050 A1 | 3/2008 | Klonover et al. | |
| 2008/0081608 A1 | 4/2008 | Findikli et al. | |
| 2008/0096553 A1* | 4/2008 | Saksena | H04W 28/06 455/426.2 |
| 2008/0238430 A1 | 10/2008 | Page et al. | |
| 2008/0263410 A1 | 10/2008 | Mittal et al. | |
| 2008/0313313 A1* | 12/2008 | Doshi | H04L 67/34 709/221 |
| 2008/0319728 A1 | 12/2008 | Bruski et al. | |
| 2009/0063062 A1 | 3/2009 | Takamatsu et al. | |
| 2009/0112505 A1 | 4/2009 | Engel et al. | |
| 2009/0119084 A1 | 5/2009 | Nagashima et al. | |
| 2009/0170528 A1* | 7/2009 | Bull | H04W 4/021 455/456.2 |
| 2009/0215444 A1 | 8/2009 | Topaltzas | |
| 2009/0216495 A1 | 8/2009 | Fujiwara et al. | |
| 2009/0217100 A1 | 8/2009 | Grechanik et al. | |
| 2009/0249284 A1 | 10/2009 | Antosz et al. | |
| 2009/0265035 A1 | 10/2009 | Jenkinson et al. | |
| 2009/0265036 A1 | 10/2009 | Jamieson et al. | |
| 2009/0276190 A1 | 11/2009 | Bell, Jr. et al. | |
| 2009/0312009 A1* | 12/2009 | Fishel | H01Q 1/241 455/425 |
| 2010/0075664 A1 | 3/2010 | Maucksch | |
| 2010/0083045 A1 | 4/2010 | Qiu et al. | |
| 2010/0113011 A1* | 5/2010 | Gregg | H04W 24/06 455/425 |
| 2010/0134090 A1 | 6/2010 | Burns et al. | |
| 2010/0240317 A1 | 9/2010 | Giles et al. | |
| 2010/0299419 A1 | 11/2010 | Ramankutty et al. | |
| 2011/0025337 A1 | 2/2011 | Morrow et al. | |
| 2011/0047428 A1 | 2/2011 | Kikta et al. | |
| 2011/0151863 A1* | 6/2011 | Shaw | H04W 24/08 455/425 |
| 2011/0178766 A1 | 7/2011 | York et al. | |
| 2011/0275364 A1* | 11/2011 | Austin | H04L 41/06 455/423 |
| 2011/0293840 A1 | 12/2011 | Newkirk et al. | |
| 2011/0294470 A1 | 12/2011 | Pasquero et al. | |
| 2012/0041745 A1* | 2/2012 | Spilman | G06F 11/261 703/13 |
| 2012/0131515 A1 | 5/2012 | Rice | |
| 2012/0139571 A1 | 6/2012 | Nickel et al. | |
| 2012/0146956 A1 | 6/2012 | Jenkinson | |
| 2012/0280934 A1 | 11/2012 | Ha et al. | |
| 2012/0282891 A1 | 11/2012 | Mohammed et al. | |
| 2012/0300649 A1* | 11/2012 | Parmar | H04L 43/0888 370/252 |
| 2013/0047038 A1 | 2/2013 | Huang | |
| 2013/0065575 A1* | 3/2013 | Poon | H04W 4/70 455/418 |
| 2013/0078983 A1* | 3/2013 | Doshi | H04W 24/06 455/418 |
| 2013/0090881 A1 | 4/2013 | Janardhanan et al. | |
| 2013/0104105 A1 | 4/2013 | Brown et al. | |
| 2013/0179865 A1 | 7/2013 | Neumeyer et al. | |
| 2013/0183898 A1 | 7/2013 | Strid | |
| 2013/0227348 A1 | 8/2013 | Stephenson et al. | |
| 2013/0273853 A1 | 10/2013 | Reed et al. | |
| 2013/0275072 A1 | 10/2013 | Arnold et al. | |
| 2013/0294255 A1 | 11/2013 | Olgaard et al. | |
| 2013/0331080 A1 | 12/2013 | Poon et al. | |
| 2013/0338958 A1 | 12/2013 | Shanishchara et al. | |
| 2013/0345864 A1 | 12/2013 | Park | |
| 2014/0111484 A1 | 4/2014 | Welch et al. | |
| 2014/0122009 A1* | 5/2014 | Meiyappan | H04B 17/0085 702/104 |
| 2014/0242986 A1 | 8/2014 | Poon et al. | |
| 2014/0305224 A1 | 10/2014 | Zhang et al. | |
| 2014/0321303 A1* | 10/2014 | Iyer | H04L 63/1466 370/252 |
| 2014/0379935 A1 | 12/2014 | Venkatasubramaniam | |
| 2014/0380281 A1 | 12/2014 | McLaughlin | |

(56) References Cited

U.S. PATENT DOCUMENTS

| | | |
|---|---|---|
| 2015/0003505 A1 | 1/2015 | Lusted et al. |
| 2015/0024720 A1* | 1/2015 | Efrati .................... H04W 12/02 455/414.1 |
| 2015/0126132 A1* | 5/2015 | Chung ................ H04B 1/3827 455/67.14 |
| 2015/0175005 A1 | 6/2015 | Wilding et al. |
| 2015/0178421 A1 | 6/2015 | Borrelli et al. |
| 2015/0297991 A1 | 10/2015 | Mahlmeister et al. |
| 2015/0301108 A1 | 10/2015 | Hamid et al. |
| 2015/0327088 A1* | 11/2015 | Makhlouf ............. H04W 24/06 370/253 |
| 2016/0044520 A1* | 2/2016 | Iyer ....................... H04W 24/08 370/252 |
| 2016/0057607 A1* | 2/2016 | Dubesset ................ H04W 8/12 455/433 |
| 2016/0065410 A1 | 3/2016 | Brunet et al. |
| 2016/0087856 A1* | 3/2016 | Groenendijk ....... H04L 41/5009 370/242 |
| 2016/0134737 A1 | 5/2016 | Pulletikurty |
| 2016/0187876 A1* | 6/2016 | Diperna ................ G06F 3/0346 702/81 |
| 2016/0187877 A1 | 6/2016 | Diperna et al. |
| 2016/0192213 A1 | 6/2016 | Diperna et al. |
| 2016/0255192 A1 | 9/2016 | Poon et al. |
| 2016/0320889 A1 | 11/2016 | Jenkinson |
| 2016/0337053 A1 | 11/2016 | Diperna et al. |
| 2016/0356800 A1 | 12/2016 | Glavina et al. |
| 2017/0052527 A1 | 2/2017 | Dougherty et al. |
| 2017/0063474 A1 | 3/2017 | Humphrey et al. |
| 2017/0111258 A1 | 4/2017 | Bezold et al. |
| 2017/0126539 A1 | 5/2017 | Tiwari et al. |
| 2017/0149634 A1 | 5/2017 | Bezold et al. |
| 2017/0156073 A1 | 6/2017 | Liu et al. |
| 2017/0242129 A1 | 8/2017 | Kallankari et al. |
| 2017/0300402 A1 | 10/2017 | Hoffner et al. |
| 2018/0024847 A1* | 1/2018 | Campbell ............... G06F 9/453 715/708 |
| 2018/0026840 A1 | 1/2018 | Toepke et al. |
| 2018/0048555 A1* | 2/2018 | Doshi ..................... H04L 43/50 |
| 2018/0049050 A1* | 2/2018 | Doshi ................... H04W 24/06 |
| 2018/0049051 A1* | 2/2018 | Doshi ................... H04W 24/06 |
| 2018/0049052 A1* | 2/2018 | Doshi ................... H04W 24/02 |
| 2018/0049054 A1* | 2/2018 | Doshi ................... H04W 24/10 |
| 2018/0066301 A1 | 3/2018 | Karlsson et al. |
| 2018/0268378 A1 | 9/2018 | Liu et al. |
| 2018/0316443 A1 | 11/2018 | Diperna et al. |
| 2019/0020423 A1 | 1/2019 | Diperna et al. |

OTHER PUBLICATIONS

Sakai et al. ("Performance Comparison of a Custom Emulation-based Test Environment Against a Real-world LTE Testbed", ACM, 2015, pp. 106-111) (Year: 2015).*

* cited by examiner

210
Receiving test configuration information, including and user equipment control configuration information.

220
Automatically configuring a test network simulation component operable to simulate test network components including test network communication components based on the test network configuration information.

230
Automatically configuring a user equipment test control component operable to control communications with user equipment in accordance with the under test control configuration information.

1110
Receiving test configuration information, including and user equipment control configuration information.

1120
Automatically configuring a test network simulation component operable to simulate test network components including test network communication components based on the test network configuration information.

1130
Automatically configuring a user equipment test control component operable to control communications with user equipment in accordance with the under test control configuration information.

1140
Verifying configuration of the test network simulation component and the user equipment test control component.

```
┌─────────────────────────────────────────────────────────────┐
│                           1151                              │
│  Performing verification interactions between a reference   │
│              device and a local test system.                │
└─────────────────────────────────────────────────────────────┘
                              │
┌─────────────────────────────────────────────────────────────┐
│                           1152                              │
│         Reporting results of the verification interactions. │
└─────────────────────────────────────────────────────────────┘
                              │
┌─────────────────────────────────────────────────────────────┐
│                           1153                              │
│               Calibrating the local test system.            │
└─────────────────────────────────────────────────────────────┘
```

FIG. 11B

ND CALIBRATION PORTABLE TEST SYSTEMS AND METHODS

AUTOMATED VALIDATION AND CALIBRATION PORTABLE TEST SYSTEMS AND METHODS

RELATED APPLICATIONS

This application is related to the following U.S. patent applications, all of which are incorporated herein by reference in their entirety:

Ser. No. 15/236,326 entitled "Local Portable Test Systems and Methods" by Dinesh Doshi et al.;

Ser. No. 15/236,315 entitled "Automated Configurable Portable Test Systems And Methods" by Dinesh Doshi Et Al.;

Ser. No. 15/236,292 entitled "Cloud-Based Services For Management Of Cell-Based Test Systems" by Dinesh Doshi et al.; and Ser. No. 15/236,277 entitled Device Profile-Driven Automation For Cell-Based Test Systems by Dinesh Doshi et al.

FIELD OF THE INVENTION

Embodiments of the present invention relate to the field of device testing.

BACKGROUND

Numerous electronic technologies such as digital computers, video equipment, and telephone systems have facilitated increased productivity and reduced costs in processing information in most areas of business, science, and entertainment. More and more the components used in these activities interact with a network (e.g., the internet, the cloud, etc.). The number of electronic devices used in these activities is growing rapidly, with new versions and new types of devices with diverse capabilities being continuously and rapidly introduced. Thorough testing of the devices under many different scenarios is important to make sure the devices will function correctly. Providing proper testing environments is often critical to achieving accurate test results. However, when the devices are interacting with very large networks beyond the control of the tester it is difficult to ensure accurate test results.

Traditional attempts at testing devices that communicate with large networks often involve trying to simulate the large communication network. This typically involves significant resources. The traditional approaches are typically implemented in a large stationary facility or room with lots of costly equipment attempting to simulate the large communication network. In addition, providing radio frequency interference mitigation for the large facilities is also typically very expensive and involving numerous individual different test devices in a large shielded room (e.g., oscilloscopes, voltmeters, etc.). These large facilities often require significant manual interaction and supervision to accurately test a device. Each different type of device under test often involves a complete reset and reconfiguration of the large facility. It is also usually inconvenient and disruptive for ongoing field operations to ship products to a single facility for testing. Traditional attempts to automate some aspects of the testing are typically limited. Conventional approaches typically require significant manual support for various activities such as configuring the test environment, equipment maintenance, test case delivery, device profile delivery, test data collection, data analytics and reporting, and consulting, for example. These factors contribute significantly to the cost of traditional device testing.

SUMMARY

In one embodiment, a test system comprises: a network access point simulation component, a local control component, and a reference component. The network access point simulation component is configured to simulate communication network access point operations comprising test interactions with user equipment. The number of devices under test included in the user equipment and distinct network access points that are coincidentally simulated are variable. The local control component is configured to direct the network access point simulation component and to control the test interactions with the user equipment. The local control component comprises a test executive operable to direct simulation of communication network operations and the test interactions in accordance with information received from the remote control components. The reference component is operable to communicatively couple with the network access point simulation component similar to the user equipment and validate the test interactions.

In one embodiment, the network access point simulation component, local control component and reference component are portable. The reference component can be configured to simulate at least a portion of the functionality of the user equipment. The reference component is a trusted component with reliable communication characteristics and features. The reference component is also operable to enable calibration of the network access point simulation component and local control component. The reference component enables validation and calibration of the network access point simulation component operations and local control component operations in a controlled local test environment, including validation and calibration of communications with devices under test included in the user equipment. The reference component is operable to communicatively couple with the remote control components. In one exemplary implementation, the test system further comprises a test box communicatively coupled to the network access point simulation component. The test box comprises material operable to shield contents of the test box from electromagnetic radiation interference, and wherein further contents of the test box comprises the reference component.

In one embodiment, a test method comprises: receiving test configuration information; automatically configuring a test network simulation component, automatically configuring a user equipment test control component, and verifying configuration of the test network simulation component and the user equipment test control component. The test network simulation component is operable to simulate test network components comprising test network communication components based on the test network configuration information. The user equipment test control component operable to control communications with user equipment in accordance with the under test control configuration information; and verifying configuration of the test network simulation component and the user equipment test control component.

In one exemplary implementation, the test method further comprises calibrating the test network simulation component and the user equipment test control component. The verifying can be performed locally. The verifying simulates at least a portion of the functionality of the user equipment. The type of the test network component that is verified and calibrated can vary. The type of the test network components that are configured can be selected from the group comprising: a small cell, an evolved packet core (EPC) component, evolved node B (eNodeB) component, Internet Protocol Multimedia System (IMS) component and application servers.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 2 is a block diagram of an exemplary automated configuration test method in accordance with one embodiment.

FIG. 11A is a block diagram of a test method in accordance with one embodiment.

FIG. 11B is a flow chart of a verification process in accordance with one embodiment.

DETAILED DESCRIPTION

Figure 1:
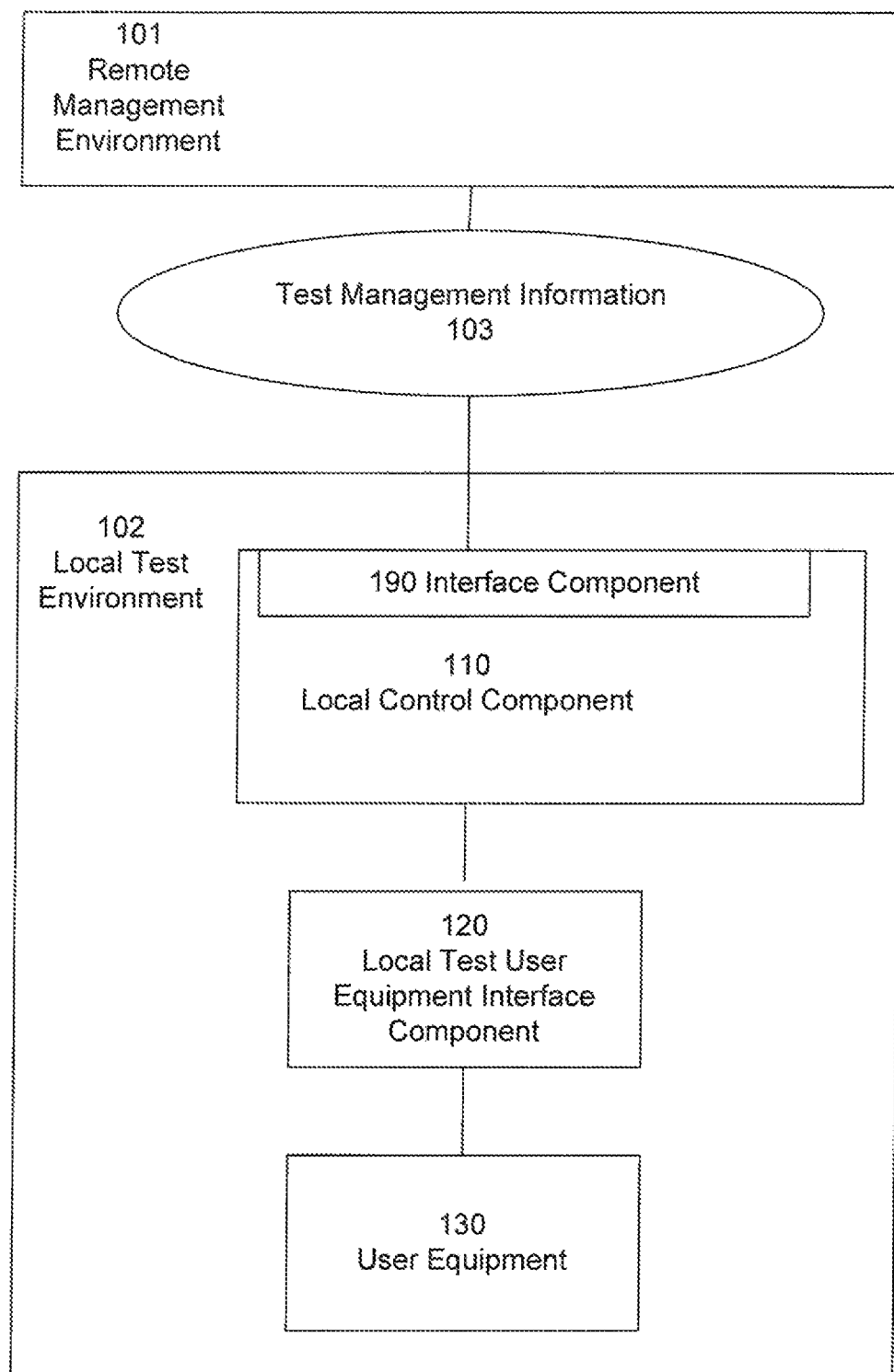
FIG. 1 is a block diagram of an exemplary test system in accordance with one embodiment.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Efficient and effective flexible test systems and methods are presented. In one embodiment, a test system is readily adaptable to a variety of configurations. The configurations can be automatically implemented locally and can be based on a large reservoir or database of test information stored and managed remotely. The test systems can be automatically configured to simulate network communication interactions that correspond to various different implementations (e.g., small cell operations, EnodeB operations, evolved packet core (EPC) operations etc). The test systems can be configured to operate in a variety of implementations (e.g., various different types of devices under test, a single device under test, a plurality of devices under test, a single network access point is simulated, a plurality of network access points are simulated, etc.). The test systems are portable and can be conveniently deployed in local environments.

The local test systems and methods facilitate easily implemented convenient local testing of various user equipment. The local test systems and methods can be portable and easy to use, unlike traditional test systems. Unlike conventional test approaches that typically have a number of limitations, traditional testing approaches usually have very cumbersome and complicated test equipment and configuration procedures that consume significant resources to implement and maintain. Even though traditional approaches consume significant resources, the testing capabilities of the traditional testing approaches are also usually limited. For example, the configuration of UE to eNodeB and EPCs (e.g., one to one, one to multiple, and multiple to multiple, etc.) are typically limited or not possible in traditional approaches. A number of traditional test systems and method are also typically directed to limited types of devices that are tested. Local test systems and methods are easily adaptable to and configurable for different UE devices under test. Traditional approaches do not even typically attempt this flexibility and scalability due to the cost of the traditional resources and daunting traditional configuration issues. In a local test system and method, the local test system components have reasonably costs to implement and the automated configuration can be substantially effortless from a user's perspective.

FIG. 1 is a block diagram of an exemplary test system 100 in accordance with one embodiment. Test system 100 includes a remote management environment 101 and a local test environment 102. The local test environment 101 includes local control component 110 and local test user equipment interface component 120. In one embodiment, the test system is configured to test user equipment 130. Local control component 110 is configured to direct the local test user equipment interface component 120 and to control test interactions with the user equipment 130. The local test user equipment interface component 120 is operable to communicate with the user equipment 130 during test operations. In one exemplary implementation, the local test user interface component 120 and local control component 110 are portable.

In one embodiment, the local test user equipment interface 120 is configured to simulate various communication characteristics and features (e.g., communications in accordance with a communication infrastructure component, protocol, network, architecture, etc.). The local test user equipment interface 120 can include communications mechanisms compatible with various different types of communication links for communicating with the user equipment 130. The communication links can include wireless communication links (e.g., cellular, WiFi, small cell, etc.), wired communication links (e.g., coaxial radio frequency (RF) link, Ethernet, universal serial bus (USB), etc.), or combinations of different types of communication links.

It is also appreciated that user equipment (UE) can include a variety of different devices under test. The devices under test may provide end users with many different capabilities (e.g., cell phones, computers, tablets, laptops, devices in the Internet-of-things (IoT), etc.). The user equipment can include the capability to collect and exchange data among themselves and with other devices over a network. The user equipment can communicate over networks through a wired or wireless medium or communication link using different types of network protocols, such as but not limited to the 3rd Generation Partnership Project (3GPP) Long-Term Evolution (LTE) standard.

Test system 100 is compatible with simulating various communication network environments or architectures for communicating with the user equipment 130. In one exemplary implementation, the local test user interface component 120 is a network access point simulation component configured to simulate network access point operations. The local control component 110 can simulate a network communication core. The components of the test system can be automatically configured. The configuration of the test environment topology is also flexible. The user equipment can comprise a single device under test or a plurality of devices under test. The number of devices under test and distinct interfaces or network access points that are coincidentally simulated is variable. A single network access point can be simulated or a plurality of network access points can be simulated.

It is appreciated that a plurality of simulated network components and network interfaces or access points can be implemented coincidentally. In one embodiment, the plurality of simulated network components and network interfaces or access points can be implemented substantially simultaneously or in parallel. It is also appreciated that a plurality of UE devices under test can be can be implemented coincidentally. In one embodiment, the plurality of simulated UE devices under test can be implemented substantially simultaneously or in parallel.

In one embodiment, local control component 110 includes an interface component 190 configured to communicate management information. Interface component 190 can be configured to communicate management information from a variety of sources and received via a variety of mechanisms. The mechanism for delivery of management information can be an external network communication connection to a component external to the local test environment, an internal communication connection to another internal test environment management component, and so on. In FIG. 1 the source of the management information is a remote management environment (e.g., test management services received from the cloud, a remote site, etc.). In another embodiment, the source of the management information is a from local test management related resource. In one exemplary implementation, the management information is communicated via a network to the local test system environment. In one exemplary implementation, the management information is loaded onto a portable storage device (e.g., a jump drive, other flash storage mechanism, DVD, etc.) at a remote location and the storage device is transported to a local test environment where the management information is downloaded from the portable storage device to a component in the local test environment (e.g., local control component 110, local test user equipment interface component 120, etc.).

In one embodiment, local control component 110 can communicate with a remote component via a real network in the remote environment 101. In one embodiment, the real network (e.g., the Web, the internet, the Cloud, etc.) is a "real" network for communicating information in a normal mode as opposed to being part of a "simulated" network used for testing. The remote component can be a server that provides various testing related information (e.g., device profile test information, test management information, etc.)

While the above management information communications and remote management environment interactions are described as flowing to the local test environment, it is appreciated the local test environment can forward information in the opposite direction. In one embodiment, the local test environment can forward information externally through similar communication mechanisms (e.g., via a communication network, via physical transportation of portable storage devices, etc.). The information can be communicated to a remote management environment.

In one embodiment, configuration of the local control component 110 and local test user equipment interface 120 is automated. The configuration can be based upon information received from the remote management environment 101. The automated configuration can include automated configuration of various aspects of a local test system (e.g., software, firmware, hardware, etc.).

The automated configuration can include automated configuration of local test systems described in Ser. No. 15/236,326 entitled "Local Portable Test Systems and Methods" by Dinesh Doshi et al., which is incorporated herein by reference. In one exemplary implementation, the configuration of local control component 110 and local test user equipment interface 120 is performed with little or no local manual interaction. The remote management environments 101 can be similar to remote management environments described in Ser. No. 15/236,292 entitled "Cloud-Based Services For Management Of Cell-Based Test Systems" by Dinesh Doshi et al., which is incorporated herein by reference. In one exemplary implementation, the configuration of local control component 110 and local test user equipment interface 120 is performed with little or no local manual interaction.

FIG. 2 is a block diagram of an exemplary automated test configuration method 200 in accordance with one embodiment. In one embodiment, the automated test configuration method 200 can be performed with little or no local manual interaction. In one exemplary implementation, a user can participate at least in part in the configuration operations. The automated test configuration method can be initiated in response to updates or newer versions of UE. The newer version of the UE may have different capabilities and communication characteristics. Thus, the local test system is automatically configured or reconfigured to handle testing of the different capabilities and communication characteristics when running tests on the UE.

In block 210, test configuration information is received. The test configuration information can include user equipment control configuration information. The test configuration information can be received from a remote management environment. The test configuration information can include device profile information. The device profile has the information or intelligence to control a given type of user equipment being tested. A device profile may be a standard application program interface (API). The API can be modified or adapted by an original equipment manufacturer (OEM) for a particular piece of UE. In one embodiment, a device profile is or includes a test script that adapts generalized software (test code) associated with a component and executed by the computer system to the specific type, make, model, and/or features of the user equipment being tested. In one exemplary implementation, the generalized software is associated with an EPC or IMF at a generic level (e.g., characteristics, features, etc. common to multiple components of the same type, etc.) and the test script adapts the generalized EPC or IMF software to an EPC config file indicating how a specific vendor or communication service provider wants an EPC or IMF configured.

In block 220, a test network simulation component operable to simulate test network components is configured, including test network communication components based on the test network configuration information. The configuration of test network simulation components can be performed locally.

The types of test network components that are configured can vary. The type of test network components that are configured can include: a small cell, an evolved packet core (EPC) component, evolved node B (eNodeB) component, Internet Protocol Multimedia System (IMS) component and application servers. The number of test network simulation components that are configured can vary. In one exemplary implementation, the configuration includes configuring a local control component. The local control component can be similar to local control component 110.

In block 230, a user equipment test control component operable to control communications with user equipment is configured in accordance with the test configuration information. The number of devices under test and the type of devices under test in the user equipment can vary. The configuring of the user equipment test control components can be performed locally. In one exemplary implementation, the configuration includes configuring a local test user equipment interface component. The test user equipment interface component can be similar to test user equipment interface component 120. In one embodiment, test user equipment interface component can at least in part be implemented on a local control component.

Figure 3:
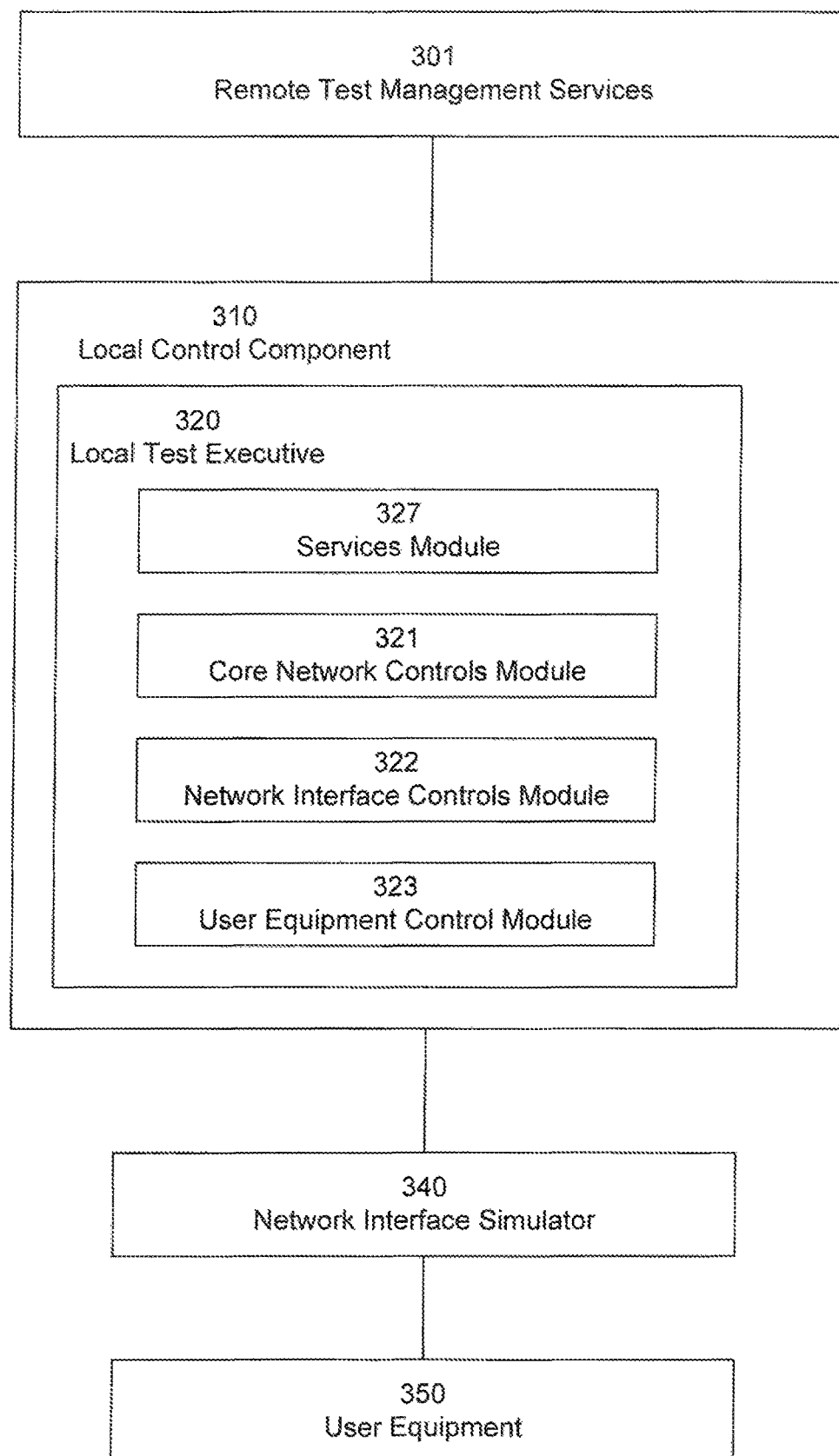
FIG. 3 is block diagram of an exemplary testing system modules in accordance with one embodiment.

In one embodiment, a local control component is implemented on a computer system. The computer system can be portable. The local control component can include various test associated modules implemented on the computer system. FIG. 3 is block diagram of exemplary testing system modules in accordance with one embodiment. Local control component 310 includes User Equipment Control Module 323, Network Interface Control Module 322, Core Network Control Module 321, and Services Module 327. User Equipment Control Module 323 controls test interactions with the user equipment. Network Interface Control Module 322 controls configuration of a local test interface component. In one embodiment, the local test interface component is a network access simulation component. The local test interface component can be a network access point component. Core Network Control Module 321 controls configuration and operations of a simulated communications network core. Services Module 327 directs simulation of various services operations. Local control component 310 communicates with user equipment 350 via network interface simulator 340. Local control component 310 also communicates with remote management services 301.

It is appreciated the test system is compatible with simulating various network environments for communicating with user equipment. The simulated network access point can simulate evolved node B (eNodeB) component operations, small cell operations, evolved packet core (EPC) operations, and so on. The configuration of the test network topology is also flexible. The user equipment can comprise a single device under test or a plurality of devices under test. A single network access point can be simulated or a plurality of network access point topologies described in Ser. No. 15/236,326 entitled "Local Portable Test Systems and Methods" by Dinesh Doshi et al., which is incorporated herein by reference.

In one embodiment, a small cell is a network access node that utilizes relatively low power radio communications with a limited range. In one exemplary implementation, the range is between approximately 10 meters and up to approximately 2 kilometers. A small cell can be a femtocell, a picocell, a microcell and so on. The small cell can include a wide range of interfaces (e.g., GSM, LTE interfaces including eNodeB, other 3GPP interfaces, CDMA 2000, W-CDMA, LTE, Wi-Fi, TD-SCDMA, etc.).

Figure 4:
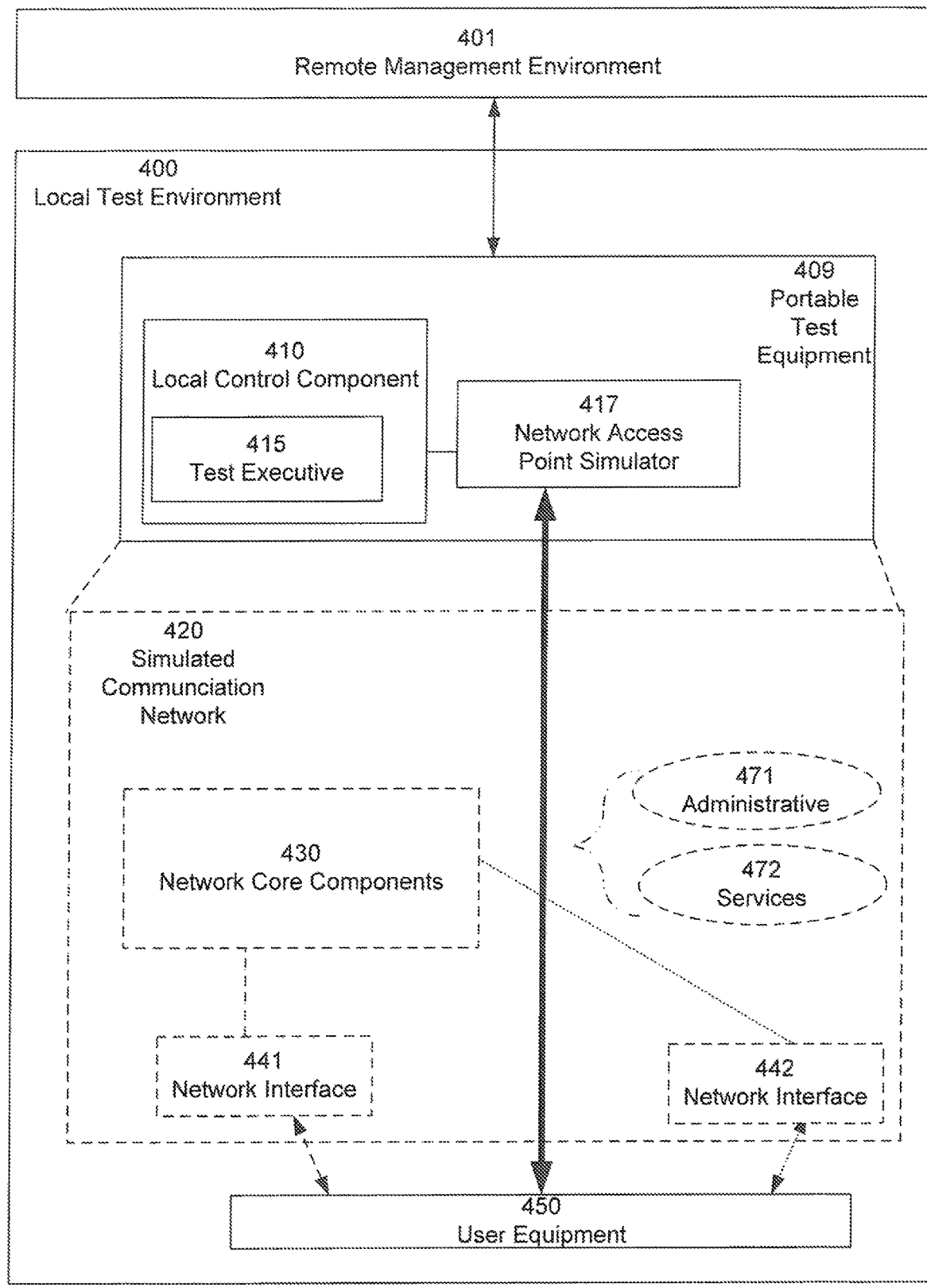
FIG. 4 is a block diagram of an exemplary local test environment 400 is accordance with one embodiment.

FIG. 4 is a block diagram of an exemplary local test environment 400 in accordance with one embodiment. Local test environment 400 includes portable test equipment 409 and user equipment 430. Portable test equipment 409 includes local control component 410 and network interface simulation component 417. Local control component includes test executive 415. Local test environment 400 can communicate with remote test environment 401.

In one embodiment, local control component 410 directs network interface simulation component 417 and controls communication with user equipment 430 via network interface simulator 417. In one exemplary implementation, local control component 410 directs configuration of network interface simulation component 417. The local control component 410 can also direct configuration of itself. The configurations can be based on information received from a remote management environment. The configuration of both local control component 410 and network interface simulation component 417 can be substantially or completely automated.

In one embodiment, the local control component 410 and network interface simulation component 417 are configured to simulate a communication network 420. The simulated communication network 420 can include network core component 430 functions and simulated network interfaces 441 and 442. The network interface simulation component 417 can simulate communications for interacting with the user equipment 430 in accordance with characteristics and features of a simulated network interface 441 and 442. The simulated network core component functions can correspond to a public data network (PDN) component functions. The local control component 411 can also simulate interactions with various services 472 and network administrative operations 471. Network interfaces 441 and 442 can include a variety of different types of interfaces with the user equipment 450. In one embodiment, network interface 441 is a cellular wireless interface and network interface 442 is a land line interface.

It is appreciated that the local flexible test system and method approach can enable testing configuration installation and maintenance that facilitates convenient and effective testing of user equipment. In one exemplary implementation, local flexible test systems and methods can handle configurations and re-configurations associated with ongoing evolutions and revisions to communication network technology.

In one embodiment, automated configuration is utilized to handle evolution of a Universal Mobile Telecommunications System (UMTS) network communication to a Long Term Evolution (LTE) network communication architecture. It is appreciated that this is not a trivial task. It is complicated and complex to deal with and implement changes from a Node B network access point interface in a Universal Terrestrial Radio Access (UTRA) of an UMTS architecture to a Evolved UMTS Terrestrial Radio Access (E-UTRA) Node B or eNode B in the UTRA of an LTE architecture. The reconfiguration can include changing the UTRA protocols of Wideband Code Division Multiple Access (WCDMA) or Time Division-Synchronous Code Multiple Access (TD-SCMA) on E-UTRA protocol Uu interfaces to Orthogonal Frequency Division Multiple Access (OFDMA) for downlinks and Singe Carrier-Frequency Domain Multiple Access (SC-FDMA) for uplinks on the LTE-Uu interfaces. Even understanding what the vast complex terminology means at high levels of description, let alone the intricate and sophisticated details of how the details of such network communication systems are implemented is very difficult to say the least. Traditional systems typically required highly trained and specialized users to configure the testing. Automated configuration in the local flexible test system and method approach enables efficient and convenient testing proliferation to a vast number of users.

Figure 5:
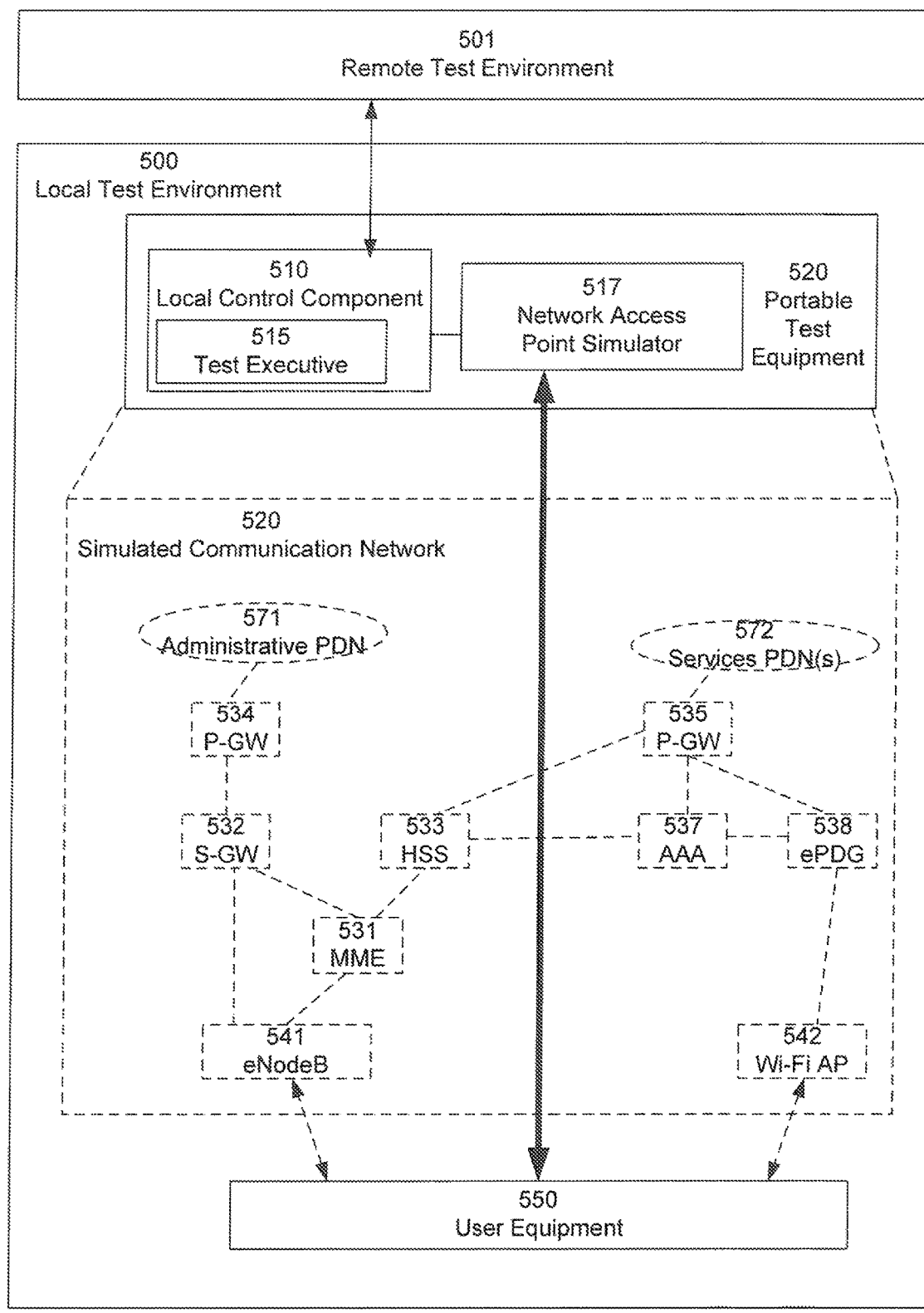
FIG. 5 is a block diagram on an exemplary local test environment evolved packet core (EPC) simulation in accordance with one embodiment.

FIG. 5 is a block diagram on an exemplary local test environment evolved packet core (EPC) simulation in accordance with one embodiment architecture. In one embodiment, the evolved packet core nodes and network access points are compatible with a system architecture evolution (SAE) architecture and core. Local test environment 500 includes portable test equipment 520 and user equipment 530. Portable test equipment 520 includes local control component 510 and network access point simulation component 517. Local control component includes test executive 515. Local test environment 500 can communicate with remote test environment 501. In one embodiment, the local control component 510 and network access point simulator 517 are configure to simulate a communication network 520. The simulated communication network 520 can include network core component 530 functions and simulated network access points 541 and 542.

The network access point simulation component 541 simulates an eNobeB access point. The simulated eNodeB access point can be compatible with 3rd Generation Partnership Project (3GPP) accesses (e.g., GPRS, UMTS, EDGE, HSPA, LTE, LTE advanced, etc.). The eNodeB network access point can be a wireless communication network access point (e.g., similar to a cellular communication system base station, a small cell, etc.). The access point 542 simulates a non-eNodeB access point (e.g., non-3GPP access technology, WiFi, etc).

The local control component 510 simulates LTE network core operations. The simulated LTE network core operations can include simulation of operations typically associated with a Mobile Management Entity (MME) 532, a Serving Gateway (S-GW) 532, a Home Subscriber Server (HSS) 533, a PDN Gateway (P-GW) 534 and 535, an AAA component 537 and an Evolved Packet Data Gateway (EPDG) 538. The simulated network core can include simulated interactions is various services 571 on PDN(s) (e.g., IMS, Internet, etc.) and administrative services 572 including Access Network Directory Selection Function (ANDSF).

Figure 6:
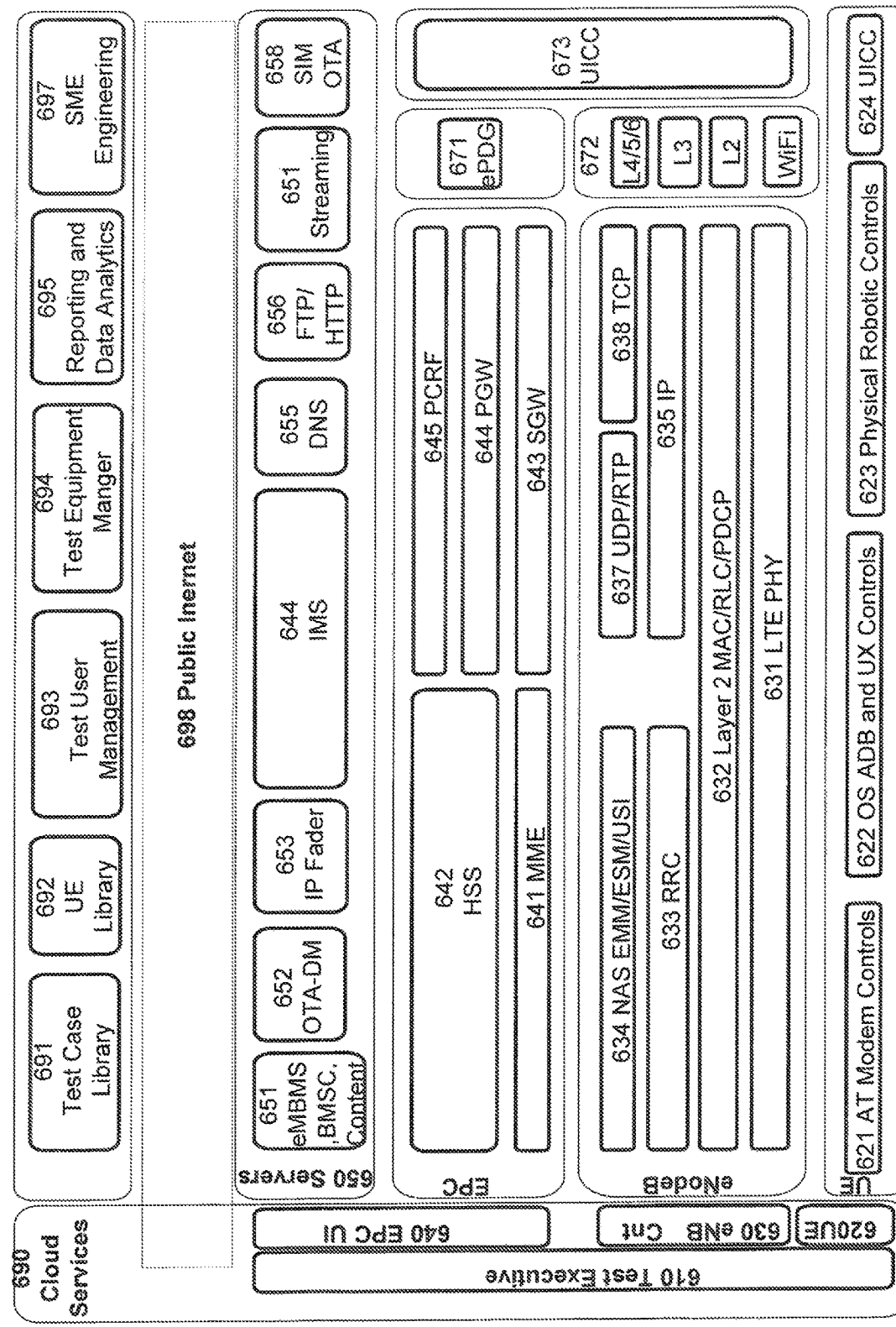
FIG. 6 is a block diagram of exemplary modules for implementing a communication network in accordance with one embodiment.

FIG. 6 is a block diagram of exemplary modules for implementing a communication network in accordance with one embodiment. Test executive 610 is implemented on a local control component in a local test environment and cloud services 690 and internet services 698 are implemented in a remote environment. Test executive 610 is similar to and LTE compatible implementation of test executive 515 in FIG. 5. Test Executive 610 includes UE control module 620, eNB control module 650, EPC control module 640. In one embodiment, EPC control module 640 can direct implementation of a user interface (UI) that enables a user to interact with the test system.

The UE control module 620 directs simulation of various UE functions including Hayes command set Attention (AT) modem control function 621, Operating System Android Debug Bridge (OS ADB) and US control function 622, physical robotic control function 623 and Universal Integrate Circuit Card (UICC) function 624. The eNode control function includes LTE PHY function 631, layer 2 Media Access Control (MAC)/Radio Link Control (RLC)/Packet Data Convergence Protocol (PDCP) function 632, Radio Resources Control (RRC) function 633, Non Access Stratum (NAS) EMME/ESM/USI function 624, Internet Protocol (IP) function 635, User Datagram Protocol (UDP)/Real-time Transport Protocol (RTP) 637, and Transmission Control Protocol (TCP) 638. The eNode B control module also simulates various other communication functions (e.g., WiFi, L2, L3, L4/5/6, etc.).

EPC control module 640 directs simulation of various EPC functions including HSS function 642, SGW function 643, PGW function 644 and PCRF function 645 and ePDG function 671. The EPC control module 640 can also direct simulation of various server functions 650 including Evolved Multimedia Broadcast Services (eMBMS), BMSC, content functions 551, Over The Air Device Management (OTA-DM) functions 652, IP Fader functions 653. IP Multimedia Subsystem (IMS) functions 654, Domain Name Service (DNS) functions 655, File Transfer Protocol (FTP)/Hyper Text Transfer Protocol (HTTP) functions 656, Streaming functions 657 and Subscriber Identification Module Over The Air management (SIM OTA) functions 658. The remote cloud services 690 can include test case library 691, UE library 672, Test User Manager 694, Reporting and Data Analytics 695 and SME Engineering 697. Working together the EPC control module 640 and eNodeB control module 630 can direct simulation of UICC function 673.

Figure 7:
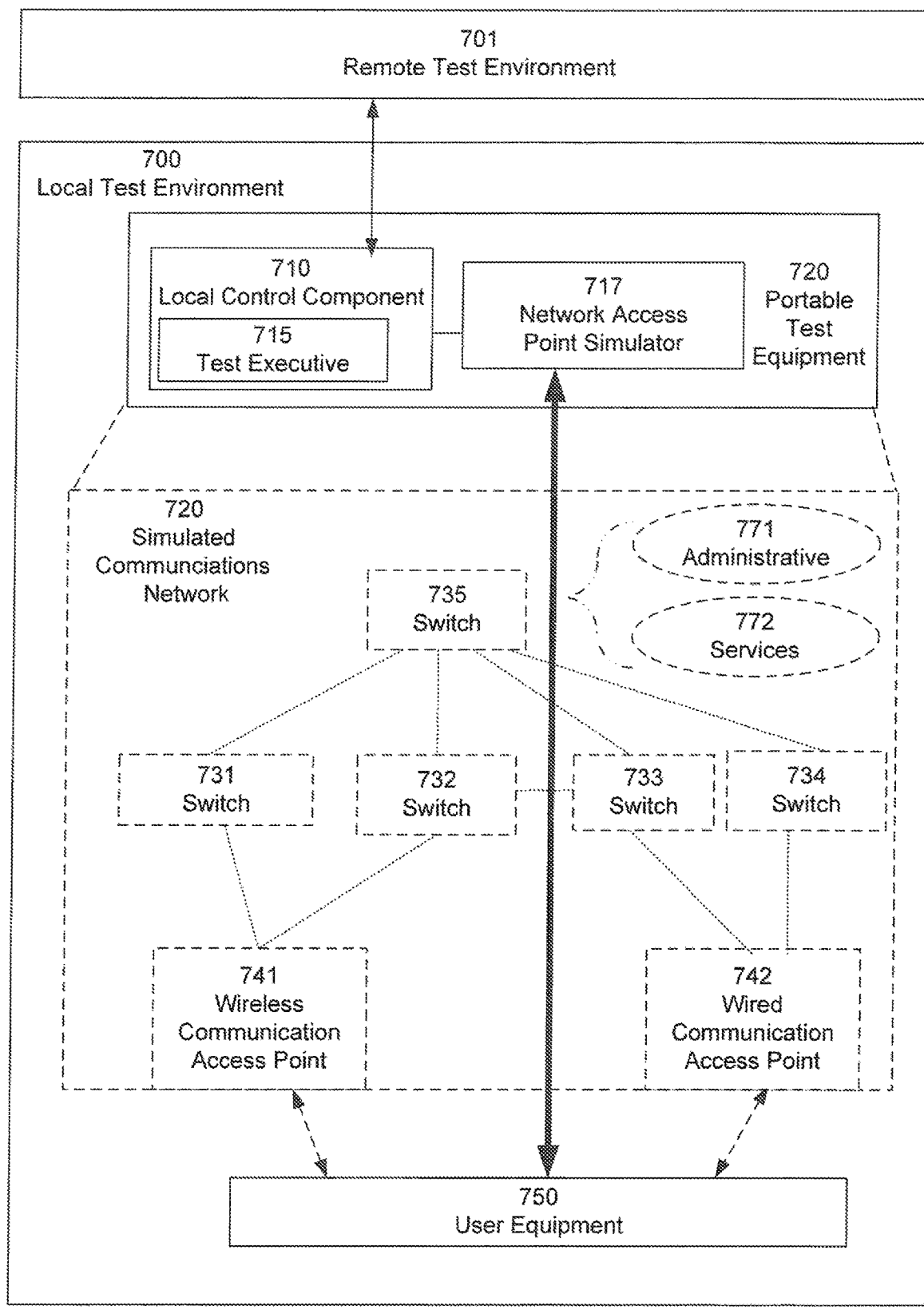
FIG. 7 is a block diagram on an exemplary local test environment general switch network simulation in accordance with one embodiment.

FIG. 7 is a block diagram of an exemplary local test environment general network switching architecture and core simulation in accordance with one embodiment. Local test environment 700 includes portable test equipment 720 and user equipment 730. Portable test equipment 720 includes local control component 710 and network access point simulation component 717. Local control component includes test executive 715. Local test environment 700 can communicate with remote test environment 701. In one embodiment, the local control component 710 and network access point simulation component 717 are configured to simulate a communication network 720. The simulated communication network 720 can include network core component functions and simulated network access points 741 and 742. In one embodiment, the network access point 741 is wireless and network access point 742 is wired. The simulated network core component functions can correspond to communication switches 731, 832, 734 and 735.

The simulated network core can include simulated interactions with various services 772 and administrative functions 771.

Figure 8:
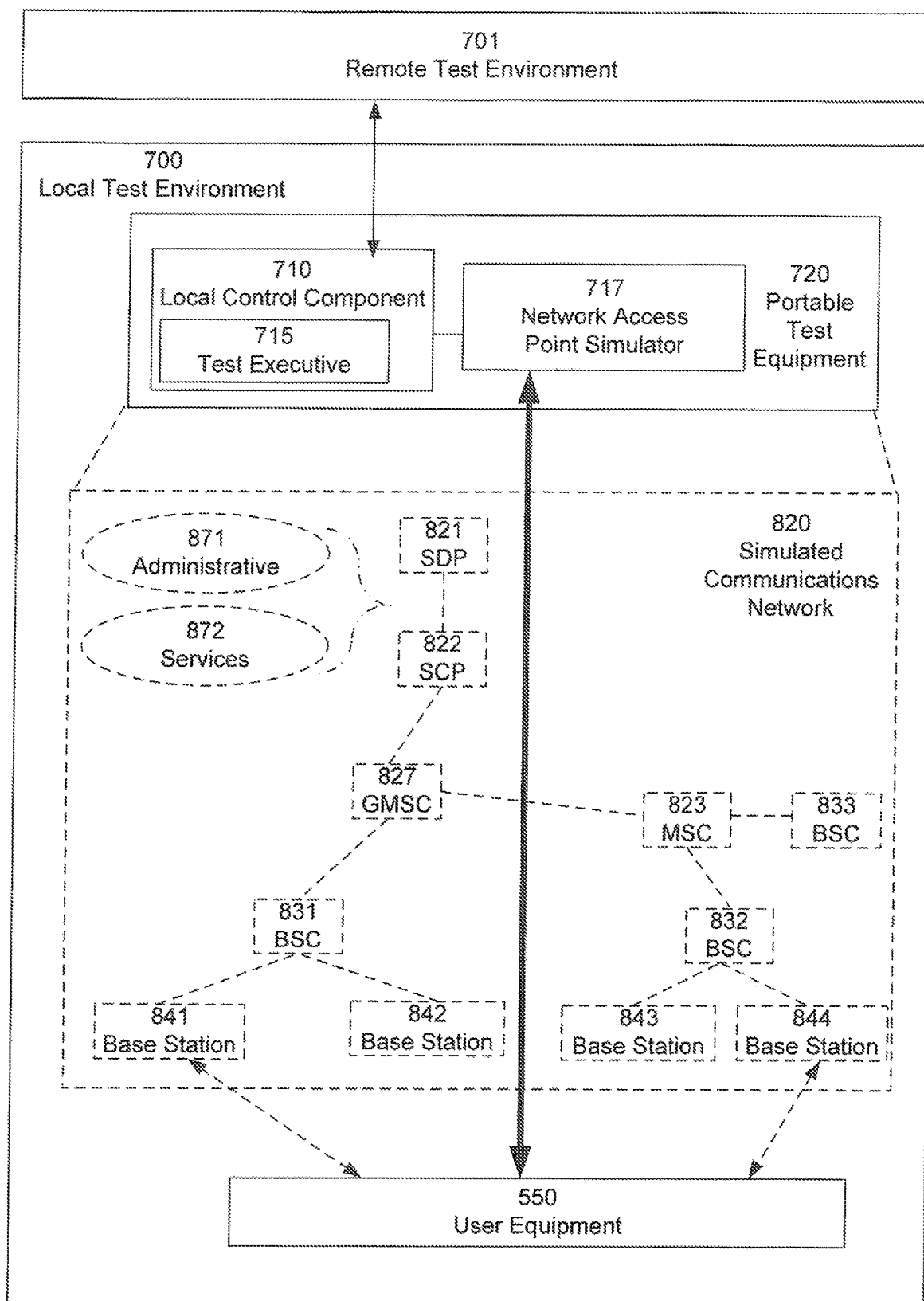
FIG. 8 is a block diagram of local test environment 700 being reconfigured to simulate a GSM network.

It is appreciated the same physical local controller and network access simulator can be automatically reconfigured to simulate a different network architecture. FIG. 8 is a block diagram of local test environment 700 being reconfigured to simulate a Global System for Mobile Communications or Group Special Mobile (GSM) network. Simulated communications network 820 includes base station network access points 841, 842, 843, and 844, Base Station Controllers (BSCs) 831, 832, and 833, Mobile Switching Center (MSC) 823, General Mobile Switching Center (GMSC) 827, Service Control Point (SCP) 822 and Service Data Point (SDP) 821. The switching centers can include a Visitor Location Registry (VLR). The core components can also communicate with a Short Message Service (SMS) center.

Figure 9:
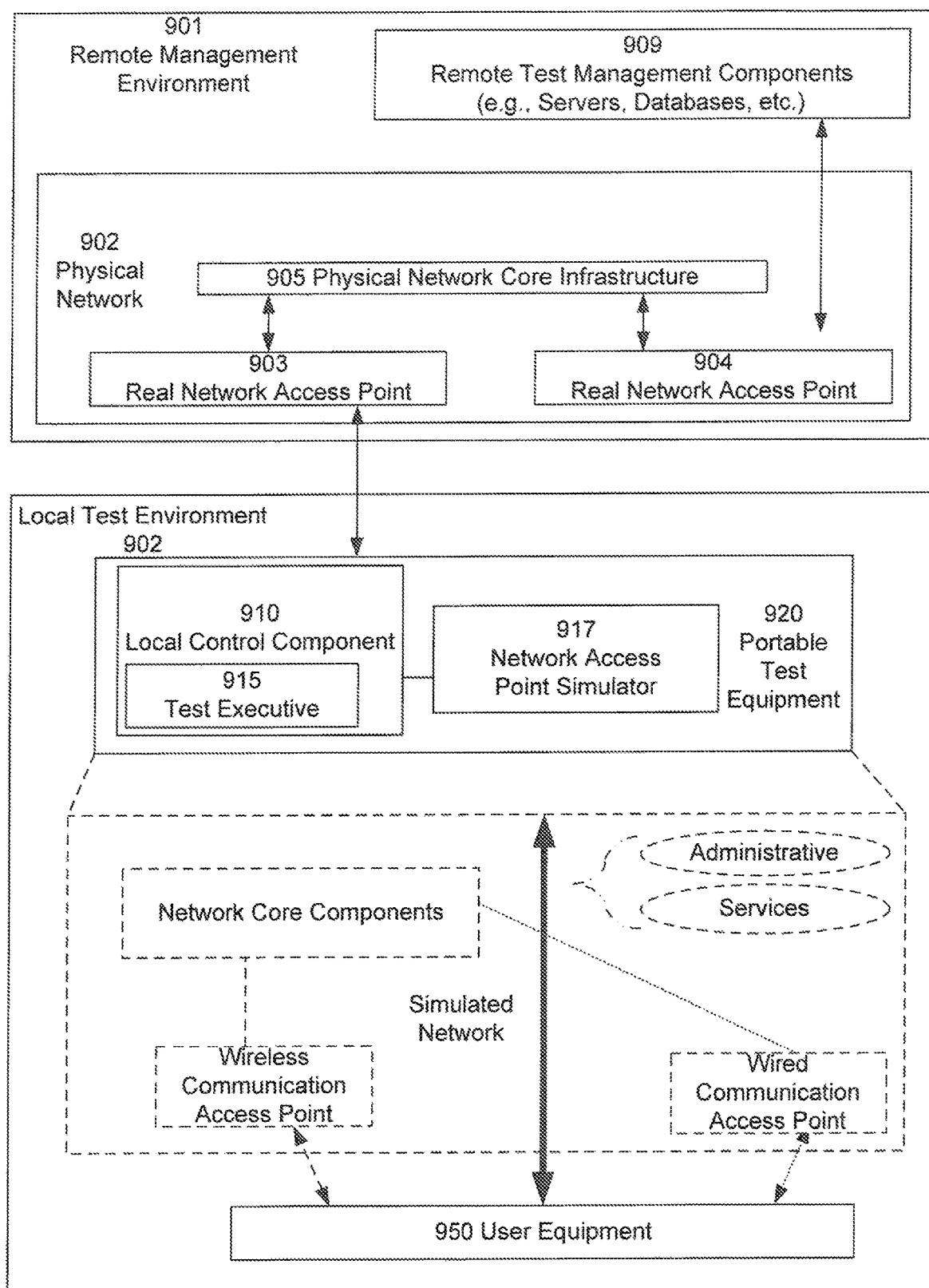
FIG. 9 is a block diagram of an exemplary test system in accordance with one embodiment.

FIG. 9 is a block diagram of an exemplary test system in accordance with one embodiment. Local test environment 900 includes portable test equipment 920 and user equipment 930. Portable test equipment 920 includes local control component 910 and network access point simulation component 917. Local control component includes test executive 915. Local test environment 900 can communicate with remote management environment 901. In one embodiment, the local control component 910 and network access point simulation component 917 are configured to simulate a communication network 920 in accordance with information received from the remote management environment 901. Remote management environment 901 real network access points 903 and 904, physical network core infrastructure 905 and remote test management components 909. The components of remote management environment 901 are real network components that participate in normal network communication operations as opposed to simulated network components in the local test environment that participated in testing operations. In one embodiment, the communications in the local test environment are protected from communication interference by components in the remote management environment.

In one embodiment, operations of a local test system are validated. The validation can include checking interactions between the local test components and a trusted reference component that simulates user equipment. The reference component can also be used for calibrating the local test components. In one exemplary implementation, the configuration of the local test system is validated.

Figure 10A:
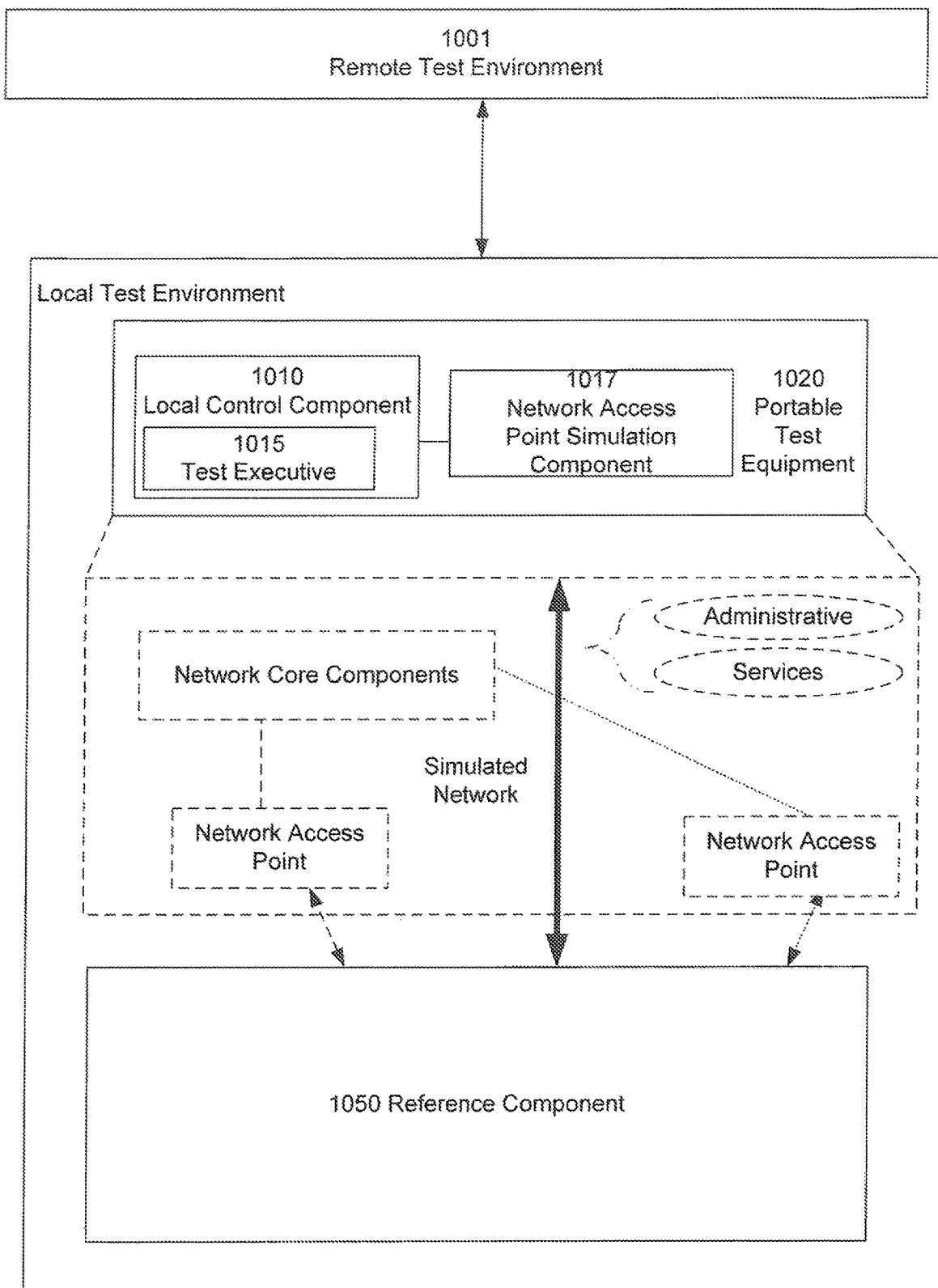
FIG. 10A is a block diagram of an exemplary test system in accordance with one embodiment.

FIG. 10A is a block diagram of an exemplary test system in accordance with one embodiment. Local test environment 1000 includes portable test equipment 1020 and user equipment 1030. Portable test equipment 1020 includes local control component 1010 and network access point simulation component 1017. In one exemplary implementation, local control component includes test executive 1015. Local test environment 1000 can communicate with remote management environment 1001. In one embodiment, the local control component 1010 and network access point simulation component 1017 are configured to simulate a communication network 1020 in accordance with information received from the remote management environment 1001.

In one embodiment, the network access point simulation component 1017 is communicatively coupled to reference component 1050. Reference component 1050 is operable to validate results of the local control component automatic configuration of the test system components. In one exemplary implementation, the reference component 1050 validates the simulated network communications are operating correctly. The network access point simulation component, local control component and reference component are portable. The reference component simulates user equipment communications. The validation includes calibration of the test system components.

Figure 10B:
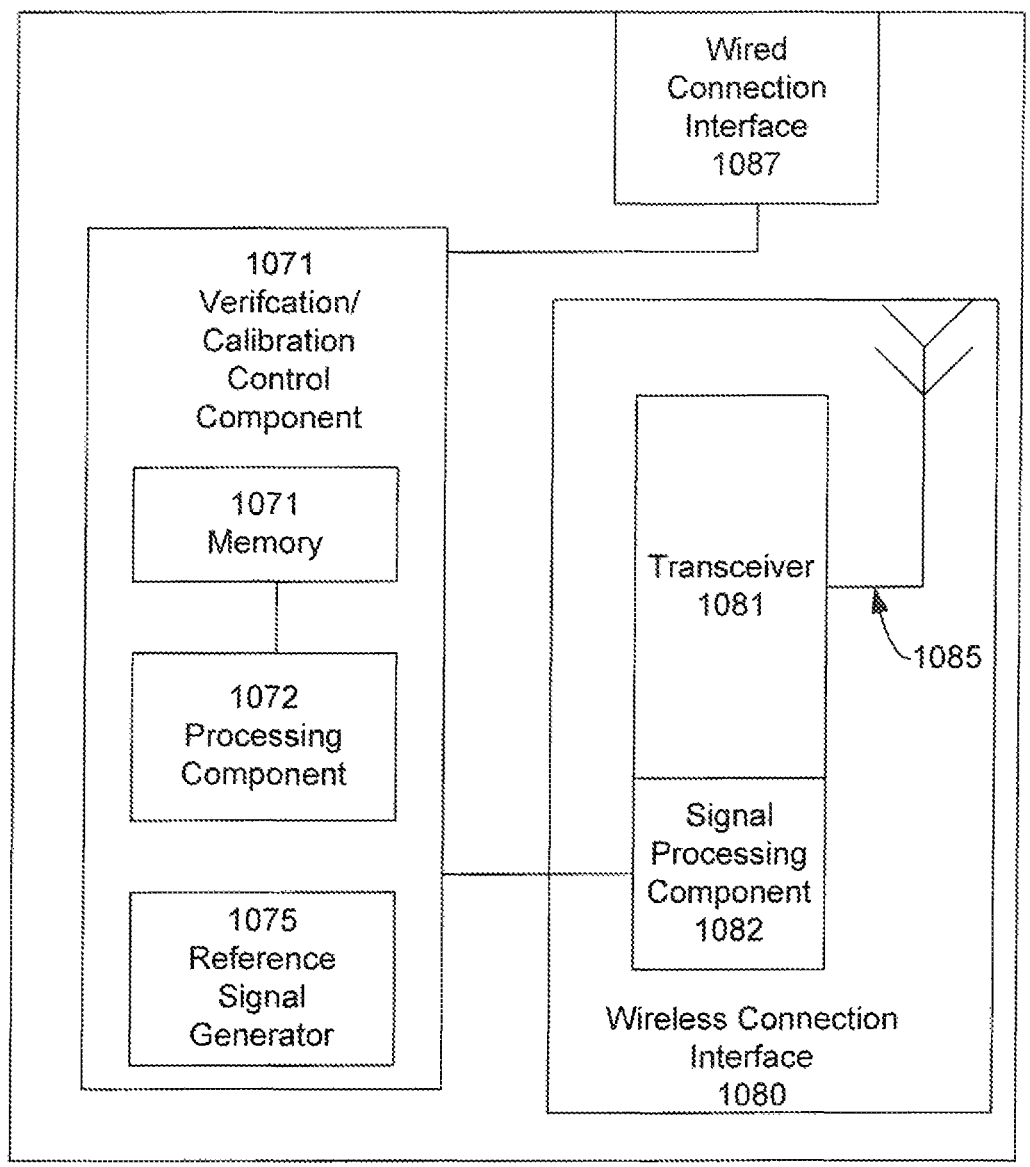
FIG. 10B is a block diagram of an exemplary reference component 1070 in accordance with one embodiment.

FIG. 10B is a block diagram of an exemplary reference component 1070 in accordance with one embodiment. Reference component 1070 includes verification and calibration control component 1071, wired connection interface 1087 and wireless connection interface 1080. The verification and calibration control component 1071 directs the verification and calibration. In one embodiment, verification and calibration control component 1071 performs gathers and analyzes information from interactions with external components (e.g., a local test system, a remote management system, etc.).

In one exemplary implementation, verification and calibration control component 1071 includes processing component 1072, memory 1071, and reference signal generator 1075. Processing component 1072 generates the processing component 1072, directions and can optionally perform analysis of the verification and calibration results. Memory 1071 stores instructions and information for processing component 1072. Reference signal generator 1075 generates reference signals with particular characteristics (e.g., particular frequency, voltage, etc.). Wireless connection interface 1080 communicates with external components wirelessly. In one exemplary implementation, Wireless connection interface 1080 includes antenna 1085, transceiver 1081, and signal processing component 1082.

In one embodiment, the reference component can be an integral part of a local test system component. In one exemplary implementation, the reference component in integrated in the local test control component. The reference component can be integrated in a network access interface simulation component.

It is appreciated that a reference component can be configured to verify and calibrate various different characteristics and features of a local test system. The reference component can verify and calibrate characteristics of a physical layer, protocol layer, and data layer. The validation of the physical layer can include checking communication signal characteristics (e.g., signal strength, frequency, waveform shape, in proper RF bandwidth, channel, MIMO correlations, differences in uplink/downlink, etc.). The reference component can verify and calibrate protocol layer activities including simulated communication network component operations (e.g., EPC operations, server operations, sequencing and scheduling of component attachment, security conformity, etc.). Verification and calibration can include data layer operations (e.g., IP, RMF, data throughput, etc.). In one embodiment, the reference component can be used to verify the integrity of the testing control in a local environment (e.g., check if a test box is shielding from environment electrical interference on RF signals, humidity of test environment, etc.).

It is appreciated that the verification and calibration can be iterative and progressive. In one embodiment, a particular verification and calibration process is performed iteratively. In one exemplary implementation, signal strength is checked and if it is week a calibration change is made to increase the strength and then the signal is checked again, and so on until the signal strength is verified or validated as correct. In one embodiment, a verification and calibration is performed progressively. In one exemplary implementation, the signal characteristics are verified and calibrated and if resolved satisfactorily, then simulated component verification and calibration are performed. If there is still an issued verification of the integrity of the testing condition control can be performed.

In one embodiment, interactions between a remote management system and a reference component include updating the reference component information and configuration information. The interactions can be communicated with or without the local test system in the communication path (e.g., the reference component can communicatively couple directly to a remote network or can go through the local test system components). In one exemplary implementation, if there is a change to UE (e.g., new or updated version of the EU is introduced by a original equipment manufacturer (OEM), correction of a bug in the UE, etc.), and a reference component is meant simulate that UE, then the remote management component can initiate a corresponding appropriate change to the reference component.

FIG. 11A is a block diagram of a test method 1100 in accordance with one embodiment.

In block 1110, test configuration information is received. The test configuration information can include and user equipment control configuration information.

In block 1120, a test network simulation component operable to simulate test network components including test network communication components based on the test network configuration information is automatically configured. The type of the test network component that is configured varies. The type of the test network components that are configured is selected from the group comprising: a small cell, an evolved packet core (EPC) component, evolved node B (eNodeB) component, Internet Protocol Multimedia System (IMS) component and application servers. The number and type of devices under test in the user equipment varies.

In block 1130, a user equipment test control component operable to control communications with user equipment in accordance with the under test control configuration information is automatically configured.

In block 1140, configuration and operations of the test network simulation component and the user equipment test control component are verified. The verification can include calibrating the test network simulation component and the user equipment test control component. The number and type of the test network simulation components that are configured varies. The verification is performed locally. In one embodiment, a verification process is performed.

FIG. 11B is a flow chart of a verification process 1150 in accordance with one embodiment. The automated verification process 1150 can be triggered by a variety of events or conditions that can be used to trigger the automated verification. The verification can be triggered based on time periodically (e.g., every day, week, year, etc.). The verification can be based on usage, such as after a certain number of UE devices under test have been tested, before certain particular types of tests are performed (an AT command test, application retry test etc.), and so on. The verification can be based on analytics of testing results. In one embodiment, if a local test system begins to indicate issues with a threshold or number of UE devices under test, a verification process can be triggered to check to make sure the local test system is working correctly and not accidentally finding issues with correctly operating UE devices under test.

The validation process can be triggered by a remote management system. In one embodiment, the remote management system performs a variety of different analytics that may indicate a validation process is appropriate. In one exemplary implementation, information from local test system interactions with a reference device is reported back to the remote management system. The information from UE testing can also be reported back to the remote management system.

Based on analytics performed by the remote management system new or additional validation operations can be triggered. In one exemplary implementation, the remote management system collects information from various different sources regarding UE testing (e.g., from OEMs, from other local test systems, etc.) and if a particular local test system UE test results are outside a norm or threshold based on the remote management system information and analytics, the remote management system can trigger a validation process for the particular local test system.

In block 1151, verification interactions between a reference device and a local test system are performed. The verification interactions are directed to verifying operations of the local test system. The verification interactions can be performed in response to an automatic triggering event. The verification interactions can include verifying communication signal characteristics, simulated component operations (e.g., simulated communication network components, other simulated components, etc.) and so on.

In block 1152, results of the verification interactions are reported. The results of the verification interactions can include indications of acceptability and problems with the operations being verified. The results can be reported to the local test system. In one exemplary implementation, the results are reported to a remote management system.

In block 1153, the local test system is calibrated. The calibration can be based upon the verification results. In one embodiment, the calibration is directed to correcting (e.g., adjusting signal power, frequency, signal shape, etc.) issues in the verification results. In one exemplary implementation, the calibration is performed in accordance with information received from a remote management system.

In one embodiment, the automated local test system configuration ensures that the user is able to easily setup and operate the local test system. The configuration automatically installs pre-requisite software, a test executive, test cases, UE library and reporting components. Various communication network simulated components are automatically installed and configured (e.g., eNodeB, EP, IMS server and other application servers for a given configuration, etc.). Software component can be automatically initialized. Validation and calibration can be performed, including using test case routines, to verify successful operation of the local test system. Again, it is appreciated that automated configuration of local test systems is user friendly and convenient, unlike traditional configuration approaches that typically involve significant manual interaction.

In one embodiment, a local test system and method automated configuration call flow includes an initialization process, retrieving information from a remote management system, performing a verification/calibration process, and so on. In one embodiment, an initialization process includes activating the local control component, receiving information from a remote management system, installing and launching local control component modules based on the received information. Retrieving information from a remote management system can include: signing on/registering account with the remote management system, downloading pre-requisites and configuration wizard information, installing virtual box applications (e.g., eNodeB, EPC, and other pre-requisites, etc.), automatically configuring the username/password, set host and confirm host status IP address. Installing and launching includes the QuiNS, Test Executive modules and simulated network components (e.g., EPC, network core components, etc.), An IMS and other application servers can be launched and verified. The eNodeB is powered up and QuiNS connects to eNodeB and verifies successful connectivity.

In one embodiment, a local test system and method automated configuration includes a validation and self calibration process. The validation and self calibration process can include communicative coupling of a reference component to a local test system environment. In one embodiment, the reference component is similar to reference component 1050. The validation and calibration process can be initiated or started automatically or manually. The local test system initializes itself, including initialization of servers (e.g., IMS, FTP, etc.). The local test system can include a local test control component and a local test user equipment interface component). In one exemplary implementation, the local test system retrieves device profile information for a reference component or reference UE. The local test system reboots the reference component and monitors network to verify successful reference component or device attachment. The IMS is monitored for successful registration. The local test system verifies several operations or activities. The operations and activities can include verification of successful mobile originated and mobile terminated SMS operations, successful data throughput operations, and various RF signal strengths. The verification can be repeated at multiple signal strength levels. Verification results can be recorded locally for each level. In one exemplary implementation, RF signal strength loses can be reported for each RF strength level. The results can also be reported externally or remotely. In one embodiment, the results can be reported to remote management environment via a variety of mechanisms. Calibration can be performed based on the verification results. The calibration can include application of proper compensations or offsets to correct issues identified during verification.

While the local testing system and method operations are automated, it is appreciated local testing systems and methods can be readily adapted to or implement varying degrees of manual interaction. In one embodiment, a UE test or local test system validation can be triggered or initiated by manual inputs and the remaining associated test or validation operations performed automatically. In one exemplary implementation, a local test system includes a local user interface. The local user interface can include a presentation of testing information (e.g., local test system configuration information, UE device under test information, testing result information, result information associated with verification/calibration of the local test system, etc.). A reference component can include a user interface for conveying verification/calibration related information and receiving user input.

A remote management system can include a remote user interface. The remote user interface can include a presentation of testing information (e.g., local test system configuration information, UE device under test information, testing result information, result information associated with verification/calibration of the local test system, etc.). In one embodiment, automated aspects of the remote management system, the remote user interface, or combinations of both can remotely monitor or take remote control of local test system and method operations.

Figure 12:
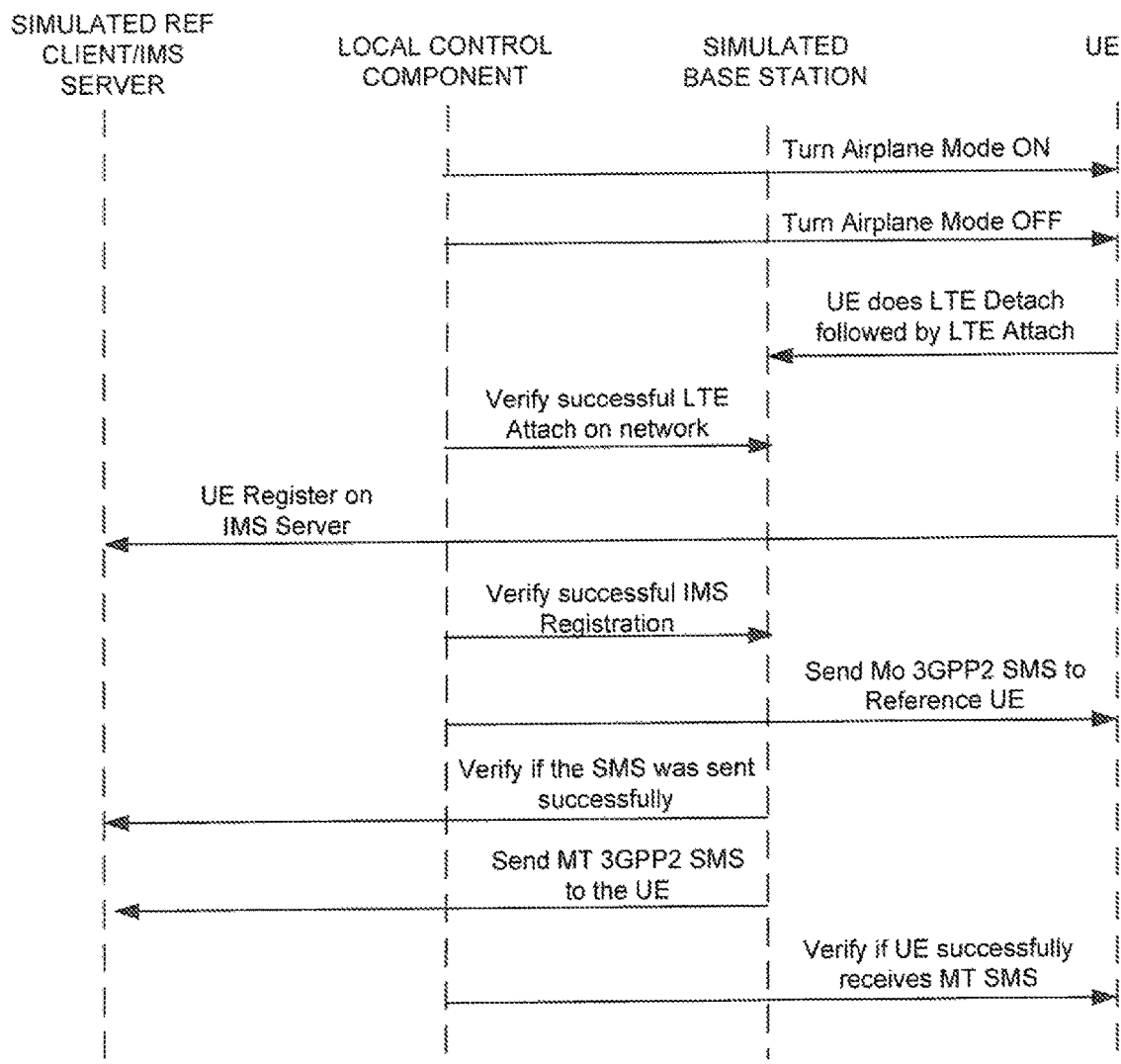
FIG. 12 is a diagram illustrating an example of certification testing of SMS over IMS capabilities using a local test system.

FIG. 12 is a diagram illustrating an example of certification testing of SMS over IMS capabilities using a local test system. In this example, the UE is a smartphone reference component and the testing is used as part of a validation process. It is appreciated that similar steps can be use to test regular user equipment. The local control component sends a "turn airplane mode on" command to the UE and then the local control component sends a "turn airplane mode off" command to the UE. The UE accomplishes LTE detachment followed by a LTE attach. The local control system verifies the LTE attachment. The UE registers with an IMS server. In one embodiment, the IMS server is simulated on a local computer system. The local control component instructs the base station to verify successful IMS registration. The simulated base station sends Mo 3GPP2 SMS to the reference UE. The base station "sends" an indication to the IMS server that verifies if the SMS was sent successfully. The local control component sends a MT 3GPP2 SMS to the UE and then verifies if UE successfully receives MT SMS.

Figure 13:
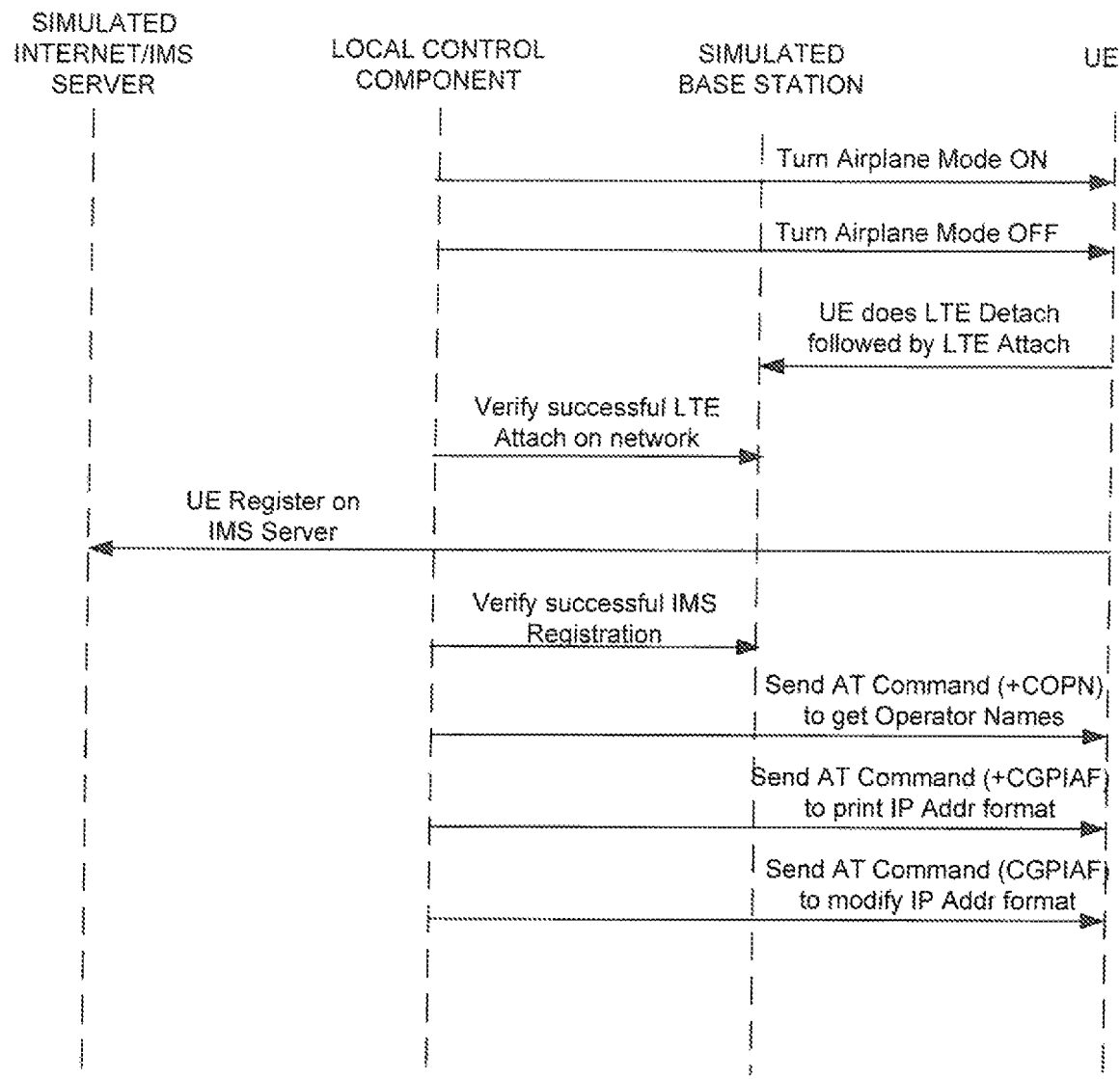
FIG. 13 is a diagram illustrating an example of certification testing of AT command capabilities using a local test system.

FIG. 13 is a diagram illustrating an example of certification testing of AT command capabilities using a local test system. In this example, the UE is a smartphone. The local control component sends a "turn airplane mode on" command to the UE and then the local control component sends a "turn airplane mode off" command to the UE. The UE accomplishes LTE detachment followed by LTE attach. At a forth operation, the local control component instructs the simulated base station to verify successful LTE attachment. The UE registers with an IMS server. In one embodiment, the IMS server is simulated on a local computer system. The local control component instructs the base station to verify successful IMS registration. In one operation, the local control component sends an AT command (plus COPN) to the UE to get operator names. In another operation, the local control component sends an AT command (plus CGPIAF) to the UE to print the IP address format. The local control component can also send an AT command (plus CGPIAF) to the UE to modify the IP address format.

Figure 14:
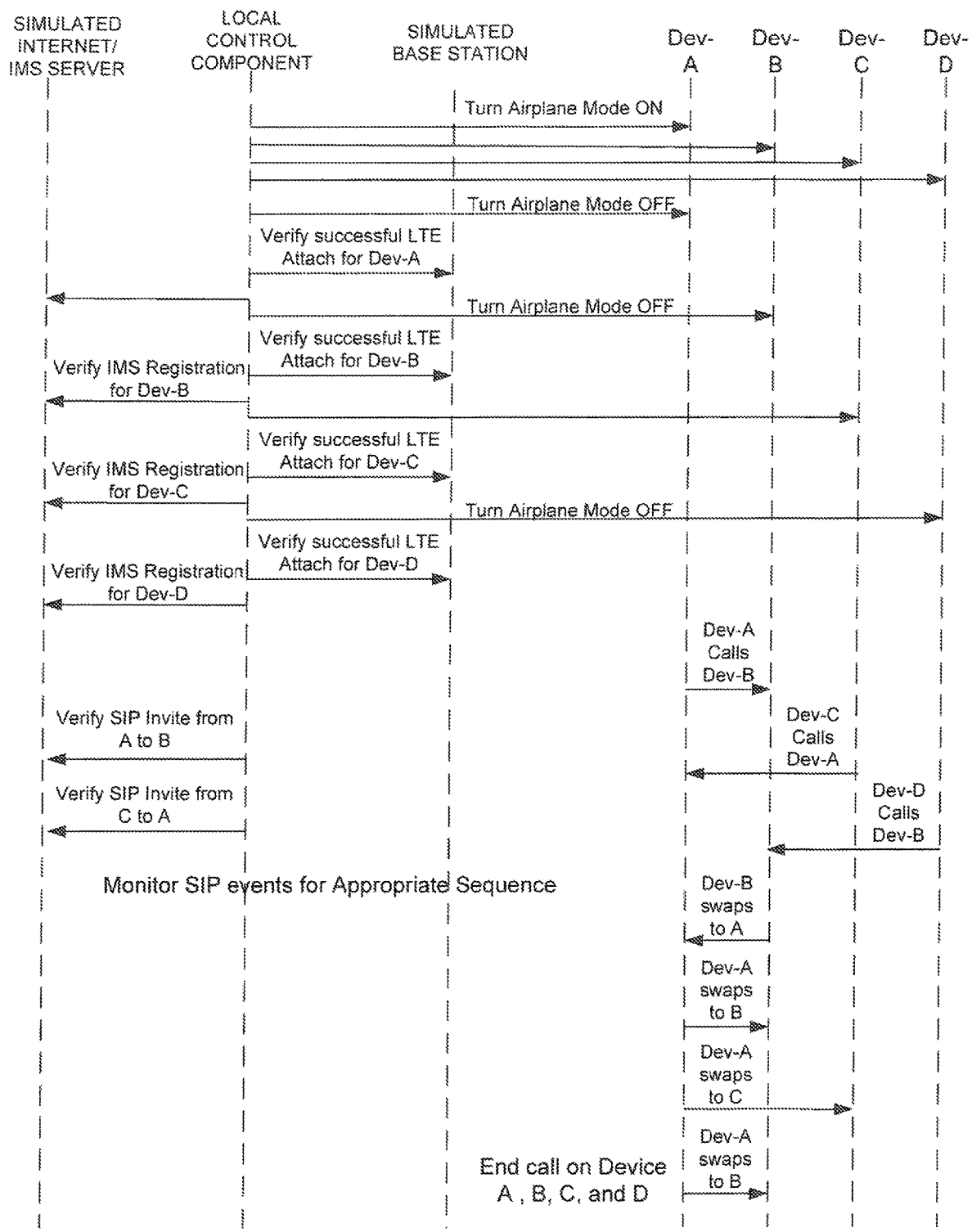
FIG. 14 is a diagram illustrating an example of RCS testing using a local test system.

FIG. 14 is a diagram illustrating an example of RCS testing using a local test system. The local control component instructs the UE devices A, B, C, and D to turn Airplane mode. Then for each UE device the local control component forwards instructions including: instructing the respective UE to turn the Airplane mode off, instructing the simulated base station to verify successful LTE Attach for the respective UE device, and verify IMS Registration with the simulated reference client/IMS server for each respective UE. Then UE device A calls UE device B, UE device C calls UE device A, and UE device D calls UE device B. The local control component verifies SIP Invite from A to B, SIP Invite from C to A, and continues to monitor SIP events for an Appropriate Sequence. Device B swaps to A, device C swaps to A, and device-D swaps to B. Then the calls on devices A, B, C, and D are ended.

Figure 15:
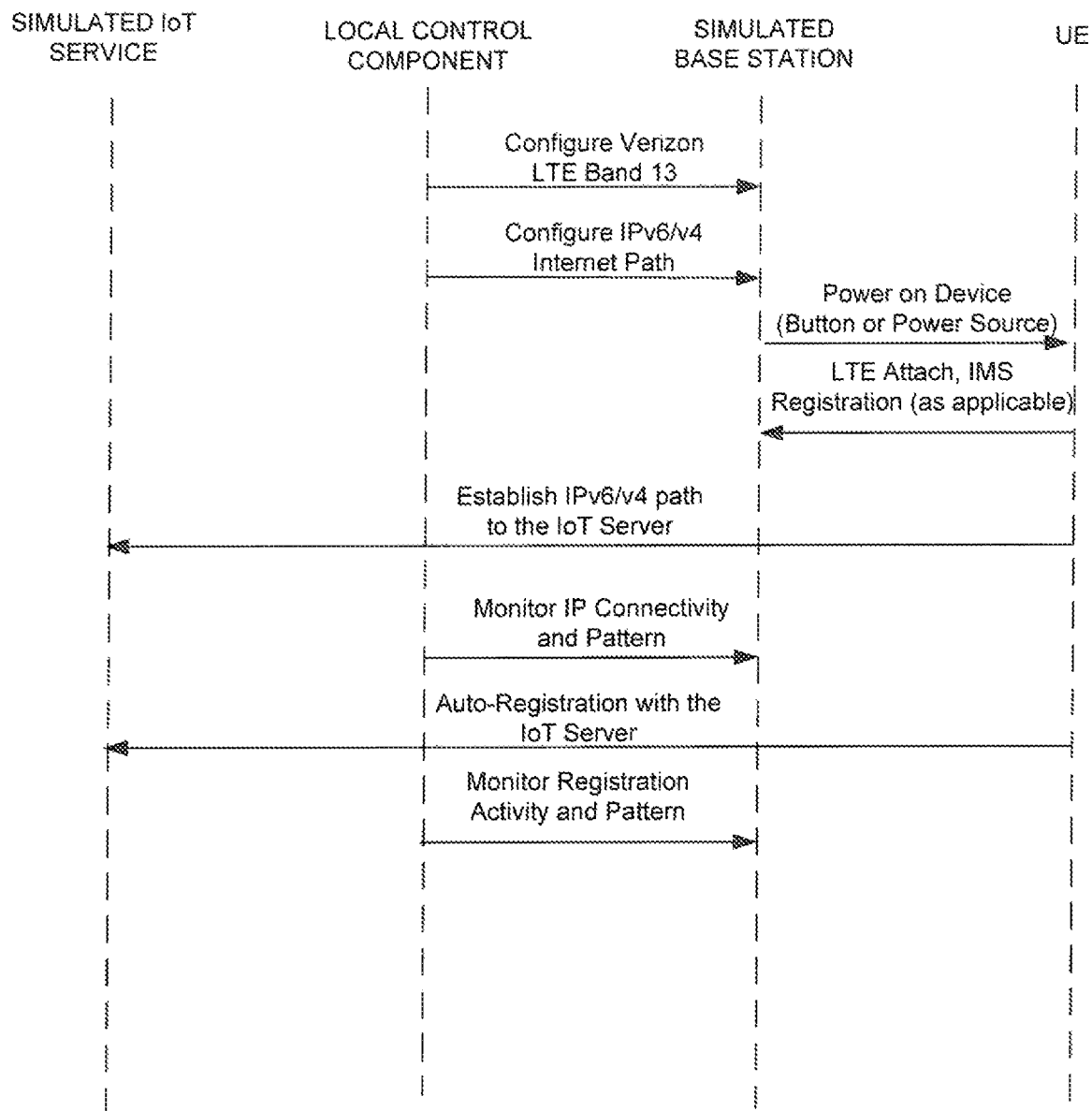
FIG. 15 is a diagram illustrating an example of a test for different scenarios using a local test system.

FIG. 15 is a diagram illustrating an example of a test for different scenarios using a local test system. In this example, the UE is an IoT device. The local control component instructs the simulated base station to configure an LTE band and to n to configure an Internet path. The UE is powered on by the local control component in a third operation. If applicable, the UE accomplishes LTE attach and registration with an IMS server (not shown) in a forth operation. A path to the IoT server 502 (which may or may not be one of the servers 102a-102n of FIG. 1) is established by the UE. The local control component can instruct the simulated base station to monitor IP connectivity and pattern. The UE auto-registers with the IoT server and the local control component instructs the simulated base station to monitor registration activity and pattern.

Figure 16:
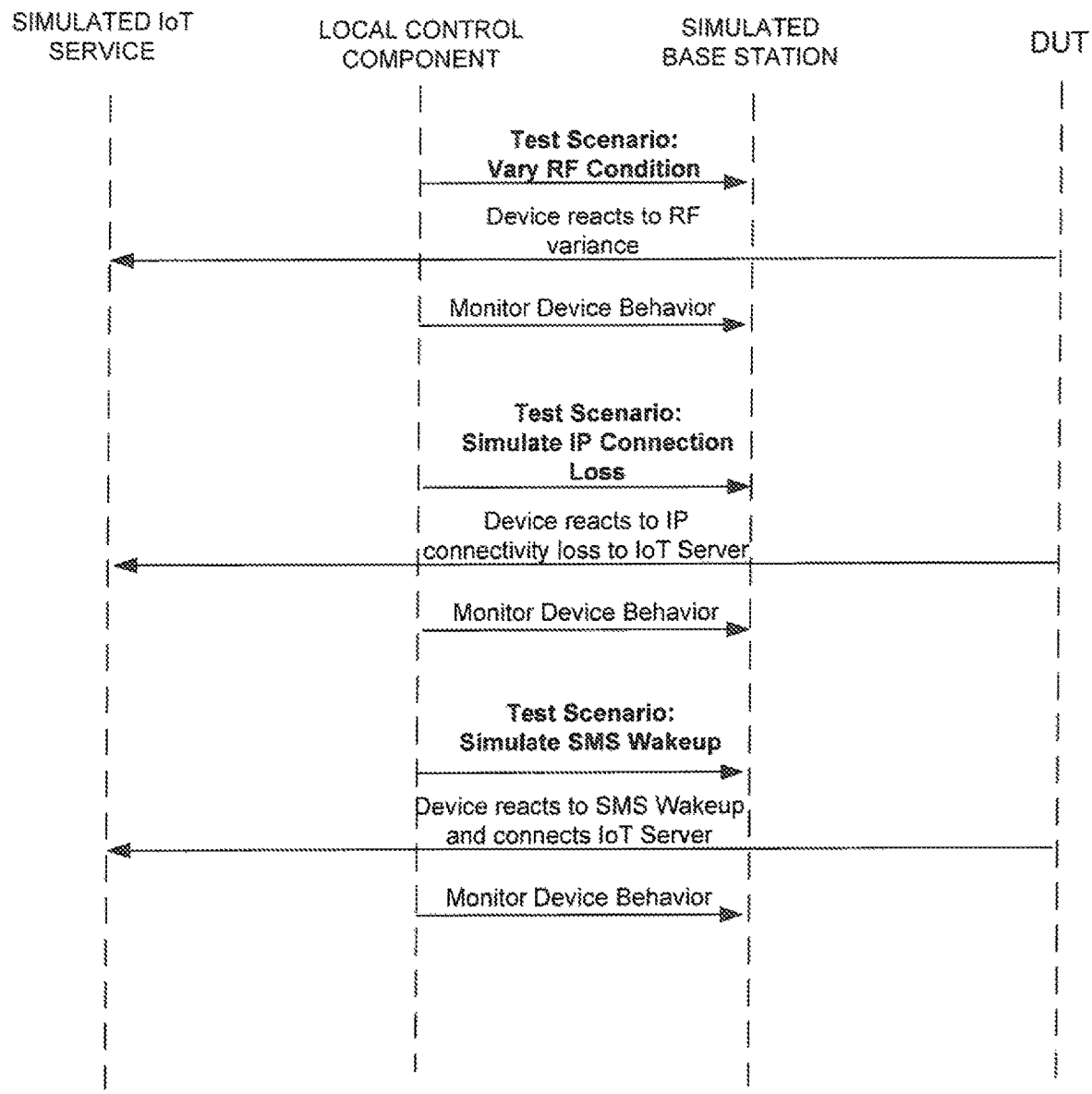
FIG. 16 is a diagram illustrating an example of a test for another application retry using a local test system.

FIG. 16 is a diagram illustrating an example of a test for another application retry using a local test system. In a first test scenario, the local control component directs the simulated base station to vary the RF condition. The UE device reacts to the RF variance and sends an indication to the local control component. The local control component monitors the UE device behavior.

In a second test scenario, the local control component directs the simulated base station to simulate an IP connection loss. The UE device reacts to the IP connection loss and sends an indication to the local control component. The local control component monitors the UE device behavior.

In a third test scenario, the local control component directs the simulated base station to simulate a SMS wakeup. The UE device reacts to the SMS wakeup and connects to the IoT server. The local control component monitors the UE device behavior.

While users may have varying degrees of understanding of normal communication networks, the automated configuration capabilities and features of the local test systems and methods enables the test systems and methods configurations to be performed by users with little or no manual interfacing or understanding of how the test systems and methods themselves work. Unlike traditional systems that typically require very sophisticated users that have a thorough understanding of intricate internal workings of the numerous components in a traditional complex test system itself (in addition to the vast different types of complicated network communication architectures and protocols involved in the testing), local test systems and methods facilitate easy configuration from a user standpoint.

Many of the described examples and embodiments of the local flexible test systems and methods are described in terms of single complex communication architectures in order not to obfuscate the invention. It is appreciated that some embodiments of the local flexible test systems and methods can be readily expanded to handle much more complicated and complex testing communication architectures and environments. In one embodiment, multiple communication core architectures can be simulated. In one exemplary implementation, configuration of the local flexible test systems can be expanded to test network communications as user equipment travels from an EPC core network to a GSM network.

Automated testing is flexibly scalable to large numbers of different devices and can be accomplished quicker, more systematically, and at less expense than, for example, manual testing. This is turn can increase test coverage, scalability and reliability while reducing time-to-market, and the cost to both manufacturers and consumers.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A test system comprising:
    a network access point simulation component configured to simulate communication network access point operations comprising test interactions with user equipment, wherein a number of devices under test included in the user equipment and distinct network access points that are coincidentally simulated are variable;
    a local control component configured to direct the network access point simulation component and to control the test interactions with the user equipment, wherein the local control component comprises a test executive operable to direct simulation of communication network operations and the test interactions in accordance with information received from remote control components; and
    a reference component operable to communicatively couple with the network access point simulation component and to be utilized in verifying interactions between the reference component and a local test system, including verifying communication signal characteristics and simulated component_operations of the network access point simulation component and the local control component; and
    a test box communicatively coupled to the network access point simulation component, wherein the test box comprises material operable to shield contents of the test box from electromagnetic radiation interference, and wherein further contents of the test box comprises the reference component.

2. The test system of claim 1, wherein the network access point simulation component, local control component and reference component are portable.

3. The test system of claim 1, wherein results of verifying interactions between the reference component and a local test system are utilized in calibration directed to correcting issues with the interactions.

4. The test system of claim 1, wherein the reference component is configured to simulate at least a portion of a functionality of the user equipment.

5. The test system of claim 1, wherein the reference component is a trusted component with reliable communication characteristics and features.

6. The test system of claim 1, wherein the reference component enables validation and calibration of communications with devices under test included in the user equipment.

7. The test system of claim 1, wherein the reference component enables validation and calibration of the network access point simulation component operations and local control component operations in a controlled local test environment.

8. The test system of claim 1, wherein the reference component is operable to communicatively couple with the remote control components.

9. A test system comprising:
a cellular network access point simulation component configured to simulate cellular communication network access point operations comprising test interactions with user equipment, wherein a number of devices under test included in the user equipment and distinct network access points that are coincidentally simulated are variable;
a local control component configured to direct the cellular network access point simulation component and to control the test interactions with the user equipment, wherein the local control component comprises a test executive operable to direct simulation of cellular communication network operations and the test interactions in accordance with information received from-remote control components; and
a reference component operable to communicatively couple with the cellular network access point simulation component and validate operations of the network access point simulation component and operations of the local control component, including verifying successful simulation of cellular communication network operations simulated by the cellular network access point simulation component and the local control component; and
a test box communicatively coupled to the cellular access point simulation component, wherein the test box comprises material operable to shield contents of the test box from electromagnetic radiation interference, and wherein further contents of the test box comprises the reference component.

10. The test system of claim 9, wherein the reference component is configured to simulate at least a portion of a functionality of the user equipment.

11. The test system of claim 9, wherein the network access point simulation component, local control component and reference component are portable.

12. The test system of claim 9, further comprising calibrating the network access point simulation component and local control component.

13. The test system of claim 12, wherein the verifying and calibrating the network access point simulation component and local control component is performed locally.

* * * * *